US010581898B1

(12) United States Patent
Singh

(10) Patent No.: US 10,581,898 B1
(45) **Date of Patent: *Mar. 3, 2020**

(54) MALICIOUS MESSAGE ANALYSIS SYSTEM

(71) Applicant: FireEye, Inc., Milpitas, CA (US)

(72) Inventor: Abhishek Singh, Morgan Hill, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,595

(22) Filed: Aug. 13, 2018

Related U.S. Application Data

(63) Continuation of application No. 14/985,266, filed on Dec. 30, 2015, now Pat. No. 10,050,998.

(51) Int. Cl.
*H04L 29/06* (2006.01)

(52) U.S. Cl.
CPC ........ *H04L 63/145* (2013.01); *H04L 63/1416* (2013.01)

(58) Field of Classification Search
None
See application file for complete search history.

(56) References Cited

U.S. PATENT DOCUMENTS 4,292,580 A 9/1981 Ott et al.
5,175,732 A 12/1992 Hendel et al.
5,319,776 A 6/1994 Hile et al.
5,440,723 A 8/1995 Arnold et al.
5,490,249 A 2/1996 Miller
5,657,473 A 8/1997 Killean et al.
5,802,277 A 9/1998 Cowlard
5,842,002 A 11/1998 Schnurer et al.
(Continued)

FOREIGN PATENT DOCUMENTS

GB 2439806 A 1/2008
GB 2490431 A 10/2012
(Continued)

OTHER PUBLICATIONS

Yuangen, Lai. Theoretical Study on Technology Threat Early Warning Management. 2009 IEEE International Conference on Industrial Engineering and Engineering Management. https://ieeexplore.ieee.org/stamp/stamp.jsp?tp=&arnumber=5372932 (Year: 2009).*
(Continued)

*Primary Examiner* — Jeremiah L Avery
(74) *Attorney, Agent, or Firm* — Rutan & Tucker, LLP

(57) ABSTRACT

A computerized technique is provided to analyze a message for malware by determining context information from attributes of the message. The attributes are determined by performing one or more of a static analysis of meta information of the message (e.g., delivery protocol attributes) to generate a first result; a dynamic analysis of an object contained in the message to generate a second result; and, in some embodiments, an emulation of the object to generate a third result. The first result, second result, and third result are correlated in accordance with one or more correlation rules to generate a threat index for the message. The threat index is compared with a predetermined threshold to determine whether the message should be classified as malware and, if so, an alert is generated.

36 Claims, 7 Drawing Sheets

(56) References Cited

U.S. PATENT DOCUMENTS 5,960,170 A 9/1999 Chen et al.
5,978,917 A 11/1999 Chi
5,983,348 A 11/1999 Ji
6,088,803 A 7/2000 Tso et al.
6,092,194 A 7/2000 Touboul
6,094,677 A 7/2000 Capek et al.
6,108,799 A 8/2000 Boulay et al.
6,118,382 A 9/2000 Hibbs et al.
6,154,844 A 11/2000 Touboul et al.
6,269,330 B1 7/2001 Cidon et al.
6,272,641 B1 8/2001 Ji
6,279,113 B1 8/2001 Vaidya
6,298,445 B1 10/2001 Shostack et al.
6,357,008 B1 3/2002 Nachenberg
6,417,774 B1 7/2002 Hibbs et al.
6,424,627 B1 7/2002 Sørhaug et al.
6,442,696 B1 8/2002 Wray et al.
6,484,315 B1 11/2002 Ziese
6,487,666 B1 11/2002 Shanklin et al.
6,493,756 B1 12/2002 O'Brien et al.
6,550,012 B1 4/2003 Villa et al.
6,700,497 B2 3/2004 Hibbs et al.
6,775,657 B1 8/2004 Baker
6,831,893 B1 12/2004 Ben Nun et al.
6,832,367 B1 12/2004 Choi et al.
6,895,550 B2 5/2005 Kanchirayappa et al.
6,898,632 B2 5/2005 Gordy et al.
6,907,396 B1 * 6/2005 Muttik .................. G06F 21/566 703/22
6,941,348 B2 9/2005 Petry et al.
6,971,097 B1 11/2005 Wallman
6,981,279 B1 12/2005 Arnold et al.
6,995,665 B2 2/2006 Appelt et al.
7,007,107 B1 2/2006 Ivchenko et al.
7,028,179 B2 4/2006 Anderson et al.
7,043,757 B2 5/2006 Hoefelmeyer et al.
7,058,822 B2 6/2006 Edery et al.
7,069,316 B1 6/2006 Gryaznov
7,080,407 B1 7/2006 Zhao et al.
7,080,408 B1 7/2006 Pak et al.
7,093,002 B2 8/2006 Wolff et al.
7,093,239 B1 8/2006 van der Made
7,096,498 B2 8/2006 Judge
7,100,201 B2 8/2006 Izatt
7,107,617 B2 9/2006 Hursey et al.
7,159,149 B2 1/2007 Spiegel et al.
7,213,260 B2 5/2007 Judge
7,231,667 B2 6/2007 Jordan
7,240,364 B1 7/2007 Branscomb et al.
7,240,368 B1 7/2007 Roesch et al.
7,243,371 B1 7/2007 Kasper et al.
7,249,175 B1 7/2007 Donaldson
7,287,278 B2 10/2007 Liang
7,308,716 B2 12/2007 Danford et al.
7,328,453 B2 2/2008 Merkle, Jr. et al.
7,346,486 B2 3/2008 Ivancic et al.
7,356,736 B2 4/2008 Natvig
7,386,888 B2 6/2008 Liang et al.
7,392,542 B2 6/2008 Bucher
7,418,729 B2 8/2008 Szor
7,428,300 B1 9/2008 Drew et al.
7,441,272 B2 10/2008 Durham et al.
7,448,084 B1 11/2008 Apap et al.
7,458,098 B2 11/2008 Judge et al.
7,464,404 B2 12/2008 Carpenter et al.
7,464,407 B2 12/2008 Nakae et al.
7,467,408 B1 12/2008 O'Toole, Jr.
7,478,428 B1 1/2009 Thomlinson
7,480,773 B1 1/2009 Reed
7,487,543 B2 2/2009 Arnold et al.
7,496,960 B1 2/2009 Chen et al.
7,496,961 B2 2/2009 Zimmer et al.
7,519,990 B1 4/2009 Xie
7,523,493 B2 4/2009 Liang et al.
7,530,104 B1 5/2009 Thrower et al.
7,540,025 B2 5/2009 Tzadikario
7,546,638 B2 6/2009 Anderson et al.
7,565,550 B2 7/2009 Liang et al.
7,568,233 B1 7/2009 Szor et al.
7,584,455 B2 9/2009 Ball
7,603,715 B2 10/2009 Costa et al.
7,607,171 B1 10/2009 Marsden et al.
7,639,714 B2 12/2009 Stolfo et al.
7,644,441 B2 1/2010 Schmid et al.
7,657,419 B2 2/2010 van der Made
7,676,841 B2 3/2010 Sobchuk et al.
7,698,548 B2 4/2010 Shelest et al.
7,707,633 B2 4/2010 Danford et al.
7,712,136 B2 5/2010 Sprosts et al.
7,730,011 B1 6/2010 Deninger et al.
7,739,740 B1 6/2010 Nachenberg et al.
7,779,463 B2 8/2010 Stolfo et al.
7,784,097 B1 8/2010 Stolfo et al.
7,832,008 B1 11/2010 Kraemer
7,836,502 B1 11/2010 Zhao et al.
7,849,506 B1 12/2010 Dansey et al.
7,854,007 B2 12/2010 Sprosts et al.
7,869,073 B2 1/2011 Oshima
7,877,803 B2 1/2011 Enstone et al.
7,904,959 B2 3/2011 Sidiroglou et al.
7,908,660 B2 3/2011 Bahl
7,930,738 B1 4/2011 Petersen
7,937,387 B2 5/2011 Frazier et al.
7,937,761 B1 5/2011 Bennett
7,949,849 B2 5/2011 Lowe et al.
7,996,556 B2 8/2011 Raghavan et al.
7,996,836 B1 8/2011 McCorkendale et al.
7,996,904 B1 8/2011 Chiueh et al.
7,996,905 B2 8/2011 Arnold et al.
8,006,305 B2 8/2011 Aziz
8,010,667 B2 8/2011 Zhang et al.
8,020,206 B2 9/2011 Hubbard et al.
8,028,338 B1 9/2011 Schneider et al.
8,042,184 B1 10/2011 Batenin
8,045,094 B2 10/2011 Teragawa
8,045,458 B2 10/2011 Alperovitch et al.
8,069,484 B2 11/2011 McMillan et al.
8,087,086 B1 12/2011 Lai et al.
8,171,553 B2 5/2012 Aziz et al.
8,176,049 B2 5/2012 Deninger et al.
8,176,480 B1 5/2012 Spertus
8,201,246 B1 6/2012 Wu et al.
8,204,984 B1 6/2012 Aziz et al.
8,205,258 B1 * 6/2012 Chang ................... G06F 21/566 726/22
8,214,905 B1 7/2012 Doukhvalov et al.
8,220,055 B1 7/2012 Kennedy
8,225,288 B2 7/2012 Miller et al.
8,225,373 B2 7/2012 Kraemer
8,233,882 B2 7/2012 Rogel
8,234,640 B1 7/2012 Fitzgerald et al.
8,234,709 B2 7/2012 Viljoen et al.
8,239,944 B1 8/2012 Nachenberg et al.
8,260,914 B1 9/2012 Ranjan
8,266,091 B1 9/2012 Gubin et al.
8,286,251 B2 10/2012 Eker et al.
8,291,499 B2 10/2012 Aziz et al.
8,307,435 B1 11/2012 Mann et al.
8,307,443 B2 11/2012 Wang et al.
8,312,545 B2 11/2012 Tuvell et al.
8,321,936 B1 11/2012 Green et al.
8,321,941 B2 11/2012 Tuvell et al.
8,332,571 B1 12/2012 Edwards, Sr.
8,365,286 B2 1/2013 Poston
8,365,297 B1 1/2013 Parshin et al.
8,370,938 B1 2/2013 Daswani et al.
8,370,939 B2 2/2013 Zaitsev et al.
8,375,444 B2 2/2013 Aziz et al.
8,381,299 B2 2/2013 Stolfo et al.
8,402,529 B1 3/2013 Green et al.
8,464,340 B2 6/2013 Ahn et al.
8,479,174 B2 7/2013 Chiriac
8,479,276 B1 7/2013 Vaystikh et al.
8,479,291 B1 7/2013 Bodke

(56) References Cited

U.S. PATENT DOCUMENTS 8,510,827 B1 8/2013 Leake et al.
8,510,828 B1 8/2013 Guo et al.
8,510,842 B2 8/2013 Amit et al.
8,516,478 B1 8/2013 Edwards et al.
8,516,590 B1 8/2013 Ranadive et al.
8,516,593 B2 8/2013 Aziz
8,522,348 B2 8/2013 Chen et al.
8,528,086 B1 9/2013 Aziz
8,533,824 B2 9/2013 Hutton et al.
8,539,582 B1 9/2013 Aziz et al.
8,549,638 B2 10/2013 Aziz
8,555,391 B1 10/2013 Demir et al.
8,561,177 B1 10/2013 Aziz et al.
8,566,476 B2 10/2013 Shiffer et al.
8,566,946 B1 10/2013 Aziz et al.
8,584,094 B2 11/2013 Dadhia et al.
8,584,234 B1 11/2013 Sobel et al.
8,584,239 B2 11/2013 Aziz et al.
8,595,834 B2 11/2013 Xie et al.
8,627,476 B1 1/2014 Satish et al.
8,635,696 B1 1/2014 Aziz
8,682,054 B2 3/2014 Xue et al.
8,682,812 B1 3/2014 Ranjan
8,689,333 B2 4/2014 Aziz
8,695,096 B1 4/2014 Zhang
8,713,631 B1 4/2014 Pavlyushchik
8,713,681 B2 4/2014 Silberman et al.
8,726,392 B1 5/2014 McCorkendale et al.
8,739,280 B2 5/2014 Chess et al.
8,776,229 B1 7/2014 Aziz
8,782,792 B1 7/2014 Bodke
8,789,172 B2 7/2014 Stolfo et al.
8,789,178 B2 7/2014 Kejriwal et al.
8,793,278 B2 7/2014 Frazier et al.
8,793,787 B2 7/2014 Ismael et al.
8,805,947 B1 8/2014 Kuzkin et al.
8,806,647 B1 8/2014 Daswani et al.
8,832,829 B2 9/2014 Manni et al.
8,850,570 B1 9/2014 Ramzan
8,850,571 B2 9/2014 Staniford et al.
8,881,234 B2 11/2014 Narasimhan et al.
8,881,271 B2 11/2014 Butler, II
8,881,282 B1 11/2014 Aziz et al.
8,898,788 B1 11/2014 Aziz et al.
8,935,779 B2 1/2015 Manni et al.
8,949,257 B2 2/2015 Shiffer et al.
8,984,638 B1 3/2015 Aziz et al.
8,990,939 B2 3/2015 Staniford et al.
8,990,944 B1 3/2015 Singh et al.
8,997,219 B2 3/2015 Staniford et al.
9,009,822 B1 4/2015 Ismael et al.
9,009,823 B1 4/2015 Ismael et al.
9,027,135 B1 5/2015 Aziz
9,071,638 B1 6/2015 Aziz et al.
9,104,867 B1 8/2015 Thioux et al.
9,106,630 B2 8/2015 Frazier et al.
9,106,694 B2 8/2015 Aziz et al.
9,118,715 B2 8/2015 Staniford et al.
9,159,035 B1 10/2015 Ismael et al.
9,171,160 B2 10/2015 Vincent et al.
9,176,843 B1 11/2015 Ismael et al.
9,189,627 B1 11/2015 Islam
9,195,829 B1 11/2015 Goradia et al.
9,197,664 B1 11/2015 Aziz et al.
9,223,972 B1 12/2015 Vincent et al.
9,225,740 B1 12/2015 Ismael et al.
9,241,010 B1 1/2016 Bennett et al.
9,251,343 B1 2/2016 Vincent et al.
9,262,635 B2 2/2016 Paithane et al.
9,268,936 B2 2/2016 Butler
9,275,229 B2 3/2016 LeMasters
9,282,109 B1 3/2016 Aziz et al.
9,292,686 B2 3/2016 Ismael et al.
9,294,501 B2 3/2016 Mesdaq et al.
9,300,686 B2 3/2016 Pidathala et al.
9,306,960 B1 4/2016 Aziz
9,306,974 B1 4/2016 Aziz et al.
9,311,479 B1 4/2016 Manni et al.
9,355,247 B1 5/2016 Thioux et al.
9,356,944 B1 5/2016 Aziz
9,363,280 B1 6/2016 Rivlin et al.
9,367,681 B1 6/2016 Ismael et al.
9,398,028 B1 7/2016 Karandikar et al.
9,413,781 B2 8/2016 Cunningham et al.
9,426,071 B1 8/2016 Caldejon et al.
9,430,646 B1 8/2016 Mushtaq et al.
9,432,389 B1 8/2016 Khalid et al.
9,438,613 B1 9/2016 Paithane et al.
9,438,622 B1 9/2016 Staniford et al.
9,438,623 B1 9/2016 Thioux et al.
9,459,901 B2 10/2016 Jung et al.
9,467,460 B1 10/2016 Otvagin et al.
9,483,644 B1 11/2016 Paithane et al.
9,495,180 B2 11/2016 Ismael
9,497,213 B2 11/2016 Thompson et al.
9,507,935 B2 11/2016 Ismael et al.
9,516,057 B2 12/2016 Aziz
9,519,781 B2 * 12/2016 Golshan ................ G06F 21/566
9,519,782 B2 12/2016 Aziz et al.
9,536,091 B2 1/2017 Paithane et al.
9,537,972 B1 1/2017 Edwards et al.
9,560,059 B1 1/2017 Islam
9,565,202 B1 2/2017 Kindlund et al.
9,591,015 B1 3/2017 Amin et al.
9,591,020 B1 3/2017 Aziz
9,594,904 B1 3/2017 Jain et al.
9,594,905 B1 3/2017 Ismael et al.
9,594,912 B1 3/2017 Thioux et al.
9,609,007 B1 3/2017 Rivlin et al.
9,621,574 B2 * 4/2017 Desai .................... H04L 63/104
9,626,509 B1 4/2017 Khalid et al.
9,628,498 B1 4/2017 Aziz et al.
9,628,507 B2 4/2017 Haq et al.
9,633,134 B2 4/2017 Ross
9,635,039 B1 4/2017 Islam et al.
9,641,546 B1 5/2017 Manni et al.
9,654,485 B1 5/2017 Neumann
9,661,009 B1 5/2017 Karandikar et al.
9,661,018 B1 5/2017 Aziz
9,674,298 B1 6/2017 Edwards et al.
9,680,862 B2 6/2017 Ismael et al.
9,690,606 B1 6/2017 Ha et al.
9,690,933 B1 6/2017 Singh et al.
9,690,935 B2 6/2017 Shiffer et al.
9,690,936 B1 6/2017 Malik et al.
9,699,205 B2 * 7/2017 Muddu ................. G06F 16/254
9,736,179 B2 8/2017 Ismael
9,740,857 B2 8/2017 Ismael et al.
9,747,446 B1 8/2017 Pidathala et al.
9,756,074 B2 9/2017 Aziz et al.
9,773,112 B1 9/2017 Rathor et al.
9,781,144 B1 10/2017 Otvagin et al.
9,787,700 B1 10/2017 Amin et al.
9,787,706 B1 10/2017 Otvagin et al.
9,792,196 B1 10/2017 Ismael et al.
9,824,209 B1 11/2017 Ismael et al.
9,824,211 B2 11/2017 Wilson
9,824,216 B1 11/2017 Khalid et al.
9,825,976 B1 11/2017 Gomez et al.
9,825,989 B1 11/2017 Mehra et al.
9,838,408 B1 12/2017 Karandikar et al.
9,838,411 B1 12/2017 Aziz
9,838,416 B1 12/2017 Aziz
9,838,417 B1 12/2017 Khalid et al.
9,846,776 B1 12/2017 Paithane et al.
9,876,701 B1 1/2018 Caldejon et al.
9,888,016 B1 2/2018 Amin et al.
9,888,019 B1 2/2018 Pidathala et al.
9,910,988 B1 3/2018 Vincent et al.
9,912,644 B2 3/2018 Cunningham
9,912,681 B1 3/2018 Ismael et al.
9,912,684 B1 3/2018 Aziz et al.
9,912,691 B2 3/2018 Mesdaq et al.
9,912,698 B1 3/2018 Thioux et al.

(56) References Cited

U.S. PATENT DOCUMENTS 9,916,440 B1 3/2018 Paithane et al.
9,921,978 B1 3/2018 Chan et al.
9,934,376 B1 4/2018 Ismael
9,934,381 B1 4/2018 Kindlund et al.
9,946,568 B1 4/2018 Ismael et al.
9,954,890 B1 4/2018 Staniford et al.
9,973,531 B1 5/2018 Thioux
10,002,252 B2 6/2018 Ismael et al.
10,019,338 B1 7/2018 Goradia et al.
10,019,573 B2 7/2018 Silberman et al.
10,025,691 B1 7/2018 Ismael et al.
10,025,927 B1 7/2018 Khalid et al.
10,027,689 B1 7/2018 Rathor et al.
10,027,690 B2 7/2018 Aziz et al.
10,027,696 B1 7/2018 Rivlin et al.
10,033,747 B1 7/2018 Paithane et al.
10,033,748 B1 7/2018 Cunningham et al.
10,033,753 B1 7/2018 Islam et al.
10,033,759 B1 7/2018 Kabra et al.
10,050,998 B1 8/2018 Singh
10,068,091 B1 9/2018 Aziz et al.
10,075,455 B2 9/2018 Zafar et al.
10,083,302 B1 9/2018 Paithane et al.
10,084,813 B2 9/2018 Eyada
10,089,461 B1 10/2018 Ha et al.
10,097,573 B1 10/2018 Aziz
10,104,102 B1 10/2018 Neumann
10,108,446 B1 10/2018 Steinberg et al.
10,121,000 B1 11/2018 Rivlin et al.
10,122,746 B1 11/2018 Manni et al.
10,133,863 B2 11/2018 Bu et al.
10,133,866 B1 11/2018 Kumar et al.
10,146,810 B2 12/2018 Shiffer et al.
10,148,693 B2 12/2018 Singh et al.
10,165,000 B1 12/2018 Aziz et al.
10,169,585 B1 1/2019 Pilipenko et al.
10,176,321 B2 1/2019 Abbasi et al.
10,181,029 B1 1/2019 Ismael et al.
10,191,861 B1 1/2019 Steinberg et al.
10,192,052 B1 1/2019 Singh et al.
10,198,574 B1 2/2019 Thioux et al.
10,200,384 B1 2/2019 Mushtaq et al.
10,210,329 B1 2/2019 Malik et al.
10,216,927 B1 2/2019 Steinberg
10,218,740 B1 2/2019 Mesdaq et al.
10,242,185 B1 3/2019 Goradia
2001/0005889 A1 6/2001 Albrecht
2001/0047326 A1 11/2001 Broadbent et al.
2002/0018903 A1 2/2002 Kokubo et al.
2002/0038430 A1 3/2002 Edwards et al.
2002/0091819 A1 7/2002 Melchione et al.
2002/0095607 A1 7/2002 Lin-Hendel
2002/0116627 A1 8/2002 Tarbotton et al.
2002/0144156 A1 10/2002 Copeland
2002/0162015 A1 10/2002 Tang
2002/0166063 A1 11/2002 Lachman et al.
2002/0169952 A1 11/2002 DiSanto et al.
2002/0184528 A1 12/2002 Shevenell et al.
2002/0188887 A1 12/2002 Largman et al.
2002/0194490 A1 12/2002 Halperin et al.
2003/0021728 A1 1/2003 Sharpe et al.
2003/0074578 A1 4/2003 Ford et al.
2003/0084318 A1 5/2003 Schertz
2003/0101381 A1 5/2003 Mateev et al.
2003/0115483 A1 6/2003 Liang
2003/0188190 A1 10/2003 Aaron et al.
2003/0191957 A1 10/2003 Hypponen et al.
2003/0200460 A1 10/2003 Morota et al.
2003/0212902 A1 11/2003 van der Made
2003/0221123 A1* 11/2003 Beavers .................. G06F 21/55 726/23
2003/0229801 A1 12/2003 Kouznetsov et al.
2003/0236995 A1* 12/2003 Fretwell, Jr. ........ H04L 63/1416 726/25
2003/0237000 A1 12/2003 Denton et al.
2004/0003323 A1 1/2004 Bennett et al.
2004/0006473 A1 1/2004 Mills et al.
2004/0015712 A1 1/2004 Szor
2004/0019832 A1 1/2004 Arnold et al.
2004/0047356 A1 3/2004 Bauer
2004/0083408 A1 4/2004 Spiegel et al.
2004/0088581 A1 5/2004 Brawn et al.
2004/0093513 A1 5/2004 Cantrell et al.
2004/0111531 A1 6/2004 Staniford et al.
2004/0117478 A1 6/2004 Triulzi et al.
2004/0117624 A1 6/2004 Brandt et al.
2004/0128355 A1 7/2004 Chao et al.
2004/0165588 A1 8/2004 Pandya
2004/0236963 A1 11/2004 Danford et al.
2004/0243349 A1 12/2004 Greifeneder et al.
2004/0249911 A1 12/2004 Alkhatib et al.
2004/0255161 A1 12/2004 Cavanaugh
2004/0268147 A1 12/2004 Wiederin et al.
2005/0005159 A1 1/2005 Oliphant
2005/0021740 A1 1/2005 Bar et al.
2005/0033960 A1 2/2005 Vialen et al.
2005/0033989 A1 2/2005 Poletto et al.
2005/0050148 A1 3/2005 Mohammadioun et al.
2005/0086523 A1 4/2005 Zimmer et al.
2005/0091513 A1 4/2005 Mitomo et al.
2005/0091533 A1 4/2005 Omote et al.
2005/0091652 A1 4/2005 Ross et al.
2005/0108562 A1 5/2005 Khazan et al.
2005/0114663 A1 5/2005 Cornell et al.
2005/0125195 A1 6/2005 Brendel
2005/0149726 A1 7/2005 Joshi et al.
2005/0157662 A1 7/2005 Bingham et al.
2005/0183143 A1 8/2005 Anderholm et al.
2005/0201297 A1 9/2005 Peikari
2005/0210533 A1 9/2005 Copeland et al.
2005/0238005 A1 10/2005 Chen et al.
2005/0240781 A1 10/2005 Gassoway
2005/0262562 A1 11/2005 Gassoway
2005/0265331 A1 12/2005 Stolfo
2005/0273856 A1 12/2005 Huddleston
2005/0283839 A1 12/2005 Cowburn
2006/0010495 A1 1/2006 Cohen et al.
2006/0015416 A1 1/2006 Hoffman et al.
2006/0015715 A1 1/2006 Anderson
2006/0015747 A1 1/2006 Van de Ven
2006/0021029 A1 1/2006 Brickell et al.
2006/0021054 A1 1/2006 Costa et al.
2006/0031476 A1 2/2006 Mathes et al.
2006/0047665 A1 3/2006 Neil
2006/0070130 A1 3/2006 Costea et al.
2006/0075496 A1 4/2006 Carpenter et al.
2006/0095968 A1 5/2006 Portolani et al.
2006/0101516 A1 5/2006 Sudaharan et al.
2006/0101517 A1 5/2006 Banzhof et al.
2006/0117385 A1 6/2006 Mester et al.
2006/0123477 A1 6/2006 Raghavan et al.
2006/0143709 A1 6/2006 Brooks et al.
2006/0150249 A1 7/2006 Gassen et al.
2006/0161983 A1 7/2006 Cothrell et al.
2006/0161987 A1 7/2006 Levy-Yurista
2006/0161989 A1 7/2006 Reshef et al.
2006/0164199 A1 7/2006 Gilde et al.
2006/0173992 A1 8/2006 Weber et al.
2006/0179147 A1 8/2006 Tran et al.
2006/0184632 A1 8/2006 Marino et al.
2006/0191010 A1 8/2006 Benjamin
2006/0221956 A1 10/2006 Narayan et al.
2006/0236393 A1 10/2006 Kramer et al.
2006/0242709 A1 10/2006 Seinfeld et al.
2006/0248519 A1 11/2006 Jaeger et al.
2006/0248582 A1 11/2006 Panjwani et al.
2006/0251104 A1 11/2006 Koga
2006/0288417 A1 12/2006 Bookbinder et al.
2007/0006288 A1 1/2007 Mayfield et al.
2007/0006313 A1 1/2007 Porras et al.
2007/0011174 A1 1/2007 Takaragi et al.
2007/0016951 A1 1/2007 Piccard et al.
2007/0019286 A1 1/2007 Kikuchi
2007/0033645 A1 2/2007 Jones

(56) References Cited

U.S. PATENT DOCUMENTS

2007/0038943 A1 2/2007 FitzGerald et al.
2007/0064689 A1 3/2007 Shin et al.
2007/0074169 A1 3/2007 Chess et al.
2007/0079379 A1* 4/2007 Sprosts ................ G06Q 10/107 726/24
2007/0094730 A1 4/2007 Bhikkaji et al.
2007/0101435 A1 5/2007 Konanka et al.
2007/0128855 A1 6/2007 Cho et al.
2007/0142030 A1 6/2007 Sinha et al.
2007/0143827 A1 6/2007 Nicodemus et al.
2007/0156895 A1 7/2007 Vuong
2007/0157180 A1 7/2007 Tillmann et al.
2007/0157306 A1 7/2007 Elrod et al.
2007/0168988 A1 7/2007 Eisner et al.
2007/0171824 A1 7/2007 Ruello et al.
2007/0174915 A1 7/2007 Gribble et al.
2007/0192500 A1 8/2007 Lum
2007/0192858 A1 8/2007 Lum
2007/0198275 A1 8/2007 Malden et al.
2007/0208822 A1 9/2007 Wang et al.
2007/0220607 A1 9/2007 Sprosts et al.
2007/0240218 A1 10/2007 Tuvell et al.
2007/0240219 A1 10/2007 Tuvell et al.
2007/0240220 A1 10/2007 Tuvell et al.
2007/0240222 A1 10/2007 Tuvell et al.
2007/0250930 A1 10/2007 Aziz et al.
2007/0256132 A2 11/2007 Oliphant
2007/0271446 A1 11/2007 Nakamura
2008/0005782 A1 1/2008 Aziz
2008/0016569 A1* 1/2008 Hammer ............... G06F 21/554 726/23
2008/0018122 A1 1/2008 Zierler et al.
2008/0028463 A1 1/2008 Dagon et al.
2008/0032556 A1 2/2008 Schreier
2008/0040710 A1 2/2008 Chiriac
2008/0046781 A1 2/2008 Childs et al.
2008/0066179 A1 3/2008 Liu
2008/0072326 A1 3/2008 Danford et al.
2008/0077793 A1 3/2008 Tan et al.
2008/0080518 A1 4/2008 Hoeflin et al.
2008/0086720 A1 4/2008 Lekel
2008/0098476 A1 4/2008 Syversen
2008/0120722 A1 5/2008 Sima et al.
2008/0134178 A1 6/2008 Fitzgerald et al.
2008/0134334 A1 6/2008 Kim et al.
2008/0141376 A1 6/2008 Clausen et al.
2008/0181227 A1 7/2008 Todd
2008/0184367 A1 7/2008 McMillan et al.
2008/0184373 A1 7/2008 Traut et al.
2008/0189787 A1 8/2008 Arnold et al.
2008/0201778 A1 8/2008 Guo et al.
2008/0209557 A1 8/2008 Herley et al.
2008/0215742 A1 9/2008 Goldszmidt et al.
2008/0222729 A1 9/2008 Chen et al.
2008/0263665 A1 10/2008 Ma et al.
2008/0295172 A1 11/2008 Bohacek
2008/0301810 A1 12/2008 Lehane et al.
2008/0307524 A1 12/2008 Singh et al.
2008/0313738 A1 12/2008 Enderby
2008/0320594 A1 12/2008 Jiang
2009/0003317 A1 1/2009 Kasralikar et al.
2009/0007100 A1 1/2009 Field et al.
2009/0013408 A1 1/2009 Schipka
2009/0031423 A1 1/2009 Liu et al.
2009/0036111 A1 2/2009 Danford et al.
2009/0037835 A1 2/2009 Goldman
2009/0044024 A1 2/2009 Oberheide et al.
2009/0044274 A1 2/2009 Budko et al.
2009/0064332 A1 3/2009 Porras et al.
2009/0077666 A1 3/2009 Chen et al.
2009/0083369 A1 3/2009 Marmor
2009/0083855 A1 3/2009 Apap et al.
2009/0089879 A1 4/2009 Wang et al.
2009/0094697 A1 4/2009 Provos et al.
2009/0113425 A1 4/2009 Ports et al.
2009/0125976 A1 5/2009 Wassermann et al.
2009/0126015 A1 5/2009 Monastyrsky et al.
2009/0126016 A1 5/2009 Sobko et al.
2009/0133125 A1 5/2009 Choi et al.
2009/0144823 A1 6/2009 Lamastra et al.
2009/0158430 A1 6/2009 Borders
2009/0172815 A1 7/2009 Gu et al.
2009/0187992 A1 7/2009 Poston
2009/0193293 A1 7/2009 Stolfo et al.
2009/0198651 A1 8/2009 Shiffer et al.
2009/0198670 A1 8/2009 Shiffer et al.
2009/0198689 A1 8/2009 Frazier et al.
2009/0199274 A1 8/2009 Frazier et al.
2009/0199296 A1 8/2009 Xie et al.
2009/0228233 A1 9/2009 Anderson et al.
2009/0241187 A1 9/2009 Troyansky
2009/0241190 A1 9/2009 Todd et al.
2009/0265692 A1 10/2009 Godefroid et al.
2009/0271867 A1 10/2009 Zhang
2009/0300415 A1 12/2009 Zhang et al.
2009/0300761 A1 12/2009 Park et al.
2009/0328185 A1 12/2009 Berg et al.
2009/0328221 A1 12/2009 Blumfield et al.
2010/0005146 A1 1/2010 Drako et al.
2010/0011205 A1 1/2010 McKenna
2010/0017546 A1 1/2010 Poo et al.
2010/0030996 A1 2/2010 Butler, II
2010/0031353 A1* 2/2010 Thomas ............. G06F 11/3604 726/22
2010/0037314 A1 2/2010 Perdisci et al.
2010/0043073 A1 2/2010 Kuwamura
2010/0054278 A1 3/2010 Stolfo et al.
2010/0058474 A1 3/2010 Hicks
2010/0064044 A1 3/2010 Nonoyama
2010/0077481 A1 3/2010 Polyakov et al.
2010/0083376 A1 4/2010 Pereira et al.
2010/0115621 A1 5/2010 Staniford et al.
2010/0132038 A1 5/2010 Zaitsev
2010/0154056 A1 6/2010 Smith et al.
2010/0180344 A1 7/2010 Malyshev et al.
2010/0192223 A1 7/2010 Ismael et al.
2010/0220863 A1 9/2010 Dupaquis et al.
2010/0235831 A1 9/2010 Dittmer
2010/0251104 A1 9/2010 Massand
2010/0281102 A1 11/2010 Chinta et al.
2010/0281541 A1 11/2010 Stolfo et al.
2010/0281542 A1 11/2010 Stolfo et al.
2010/0287260 A1 11/2010 Peterson et al.
2010/0299754 A1 11/2010 Amit et al.
2010/0306173 A1 12/2010 Frank
2011/0004737 A1 1/2011 Greenebaum
2011/0025504 A1 2/2011 Lyon et al.
2011/0035784 A1 2/2011 Jakobsson
2011/0041179 A1 2/2011 St Hlberg
2011/0047594 A1 2/2011 Mahaffey et al.
2011/0047620 A1 2/2011 Mahaffey et al.
2011/0055907 A1 3/2011 Narasimhan et al.
2011/0078794 A1 3/2011 Manni et al.
2011/0093951 A1 4/2011 Aziz
2011/0099620 A1 4/2011 Stavrou et al.
2011/0099633 A1 4/2011 Aziz
2011/0099635 A1 4/2011 Silberman et al.
2011/0113231 A1 5/2011 Kaminsky
2011/0145918 A1 6/2011 Jung et al.
2011/0145920 A1 6/2011 Mahaffey et al.
2011/0145934 A1 6/2011 Abramovici et al.
2011/0167493 A1 7/2011 Song et al.
2011/0167494 A1 7/2011 Bowen et al.
2011/0173213 A1 7/2011 Frazier et al.
2011/0173460 A1 7/2011 Ito et al.
2011/0219449 A1 9/2011 St. Neitzel et al.
2011/0219450 A1 9/2011 McDougal et al.
2011/0225624 A1 9/2011 Sawhney et al.
2011/0225655 A1 9/2011 Niemela et al.
2011/0247072 A1 10/2011 Staniford et al.
2011/0265182 A1 10/2011 Peinado et al.
2011/0289582 A1 11/2011 Kejriwal et al.
2011/0302587 A1 12/2011 Nishikawa et al.
2011/0307954 A1 12/2011 Melnik et al.

(56) References Cited

U.S. PATENT DOCUMENTS

2011/0307955 A1 12/2011 Kaplan et al.
2011/0307956 A1 12/2011 Yermakov et al.
2011/0314546 A1 12/2011 Aziz et al.
2012/0023593 A1 1/2012 Puder et al.
2012/0054869 A1 3/2012 Yen et al.
2012/0066698 A1 3/2012 Yanoo
2012/0079596 A1 3/2012 Thomas et al.
2012/0084859 A1 4/2012 Radinsky et al.
2012/0096553 A1 4/2012 Srivastava et al.
2012/0110667 A1* 5/2012 Zubrilin .................. G06F 21/56 726/24
2012/0117652 A1 5/2012 Manni et al.
2012/0121154 A1 5/2012 Xue et al.
2012/0124426 A1 5/2012 Maybee et al.
2012/0174186 A1 7/2012 Aziz et al.
2012/0174196 A1 7/2012 Bhogavilli et al.
2012/0174218 A1 7/2012 McCoy et al.
2012/0198279 A1 8/2012 Schroeder
2012/0210423 A1 8/2012 Friedrichs et al.
2012/0222121 A1 8/2012 Staniford et al.
2012/0240183 A1* 9/2012 Sinha .................... H04W 12/08 726/1
2012/0255015 A1 10/2012 Sahita et al.
2012/0255017 A1 10/2012 Sallam
2012/0260342 A1 10/2012 Dube et al.
2012/0266244 A1 10/2012 Green et al.
2012/0278886 A1 11/2012 Luna
2012/0297489 A1 11/2012 Dequevy
2012/0330801 A1 12/2012 McDougal et al.
2012/0331553 A1 12/2012 Aziz et al.
2013/0014259 A1 1/2013 Gribble et al.
2013/0036472 A1 2/2013 Aziz
2013/0047257 A1 2/2013 Aziz
2013/0074185 A1 3/2013 McDougal et al.
2013/0086684 A1 4/2013 Mohler
2013/0097699 A1 4/2013 Balupari et al.
2013/0097706 A1 4/2013 Titonis et al.
2013/0111587 A1 5/2013 Goel et al.
2013/0117852 A1 5/2013 Stute
2013/0117855 A1 5/2013 Kim et al.
2013/0139264 A1 5/2013 Brinkley et al.
2013/0160125 A1 6/2013 Likhachev et al.
2013/0160127 A1 6/2013 Jeong et al.
2013/0160130 A1 6/2013 Mendelev et al.
2013/0160131 A1 6/2013 Madou et al.
2013/0167236 A1 6/2013 Sick
2013/0174214 A1 7/2013 Duncan
2013/0185789 A1 7/2013 Hagiwara et al.
2013/0185795 A1 7/2013 Winn et al.
2013/0185798 A1 7/2013 Saunders et al.
2013/0191915 A1 7/2013 Antonakakis et al.
2013/0196649 A1 8/2013 Paddon et al.
2013/0227691 A1 8/2013 Aziz et al.
2013/0246370 A1 9/2013 Bartram et al.
2013/0247186 A1 9/2013 LeMasters
2013/0263260 A1 10/2013 Mahaffey et al.
2013/0291109 A1 10/2013 Staniford et al.
2013/0298243 A1 11/2013 Kumar et al.
2013/0318038 A1 11/2013 Shiffer et al.
2013/0318073 A1 11/2013 Shiffer et al.
2013/0325791 A1 12/2013 Shiffer et al.
2013/0325792 A1 12/2013 Shiffer et al.
2013/0325871 A1 12/2013 Shiffer et al.
2013/0325872 A1 12/2013 Shiffer et al.
2014/0032875 A1 1/2014 Butler
2014/0053260 A1 2/2014 Gupta et al.
2014/0053261 A1 2/2014 Gupta et al.
2014/0130158 A1 5/2014 Wang et al.
2014/0137180 A1 5/2014 Lukacs et al.
2014/0169762 A1 6/2014 Ryu
2014/0173739 A1 6/2014 Ahuja et al.
2014/0179360 A1 6/2014 Jackson et al.
2014/0181131 A1 6/2014 Ross
2014/0189687 A1 7/2014 Jung et al.
2014/0189866 A1 7/2014 Shiffer et al.
2014/0189882 A1 7/2014 Jung et al.
2014/0201838 A1* 7/2014 Varsanyi ............... G06F 21/552 726/23
2014/0237600 A1 8/2014 Silberman et al.
2014/0280245 A1 9/2014 Wilson
2014/0283037 A1 9/2014 Sikorski et al.
2014/0283063 A1 9/2014 Thompson et al.
2014/0328204 A1 11/2014 Klotsche et al.
2014/0337836 A1 11/2014 Ismael
2014/0344926 A1 11/2014 Cunningham et al.
2014/0351935 A1 11/2014 Shao et al.
2014/0380473 A1 12/2014 Bu et al.
2014/0380474 A1 12/2014 Paithane et al.
2014/0380488 A1* 12/2014 Datta Ray ........... H04L 63/1433 726/25
2015/0007312 A1 1/2015 Pidathala et al.
2015/0096022 A1 4/2015 Vincent et al.
2015/0096023 A1 4/2015 Mesdaq et al.
2015/0096024 A1 4/2015 Haq et al.
2015/0096025 A1 4/2015 Ismael
2015/0180886 A1 6/2015 Staniford et al.
2015/0186645 A1 7/2015 Aziz et al.
2015/0199513 A1 7/2015 Ismael et al.
2015/0199531 A1 7/2015 Ismael et al.
2015/0199532 A1 7/2015 Ismael et al.
2015/0220735 A1 8/2015 Paithane et al.
2015/0372980 A1 12/2015 Eyada
2016/0004869 A1 1/2016 Ismael et al.
2016/0006756 A1 1/2016 Ismael et al.
2016/0044000 A1 2/2016 Cunningham
2016/0127393 A1 5/2016 Aziz et al.
2016/0191547 A1 6/2016 Zafar et al.
2016/0191550 A1 6/2016 Ismael et al.
2016/0261612 A1 9/2016 Mesdaq et al.
2016/0285914 A1 9/2016 Singh et al.
2016/0301703 A1 10/2016 Aziz
2016/0335110 A1 11/2016 Paithane et al.
2017/0063887 A1* 3/2017 Muddu ................ G06F 16/254
2017/0083703 A1 3/2017 Abbasi et al.
2018/0013770 A1 1/2018 Ismael
2018/0048660 A1 2/2018 Paithane et al.
2018/0121316 A1 5/2018 Ismael et al.
2018/0288077 A1 10/2018 Siddiqui et al.

FOREIGN PATENT DOCUMENTS

WO 0206928 A2 1/2002
WO 02/23805 A2 3/2002
WO 2007117636 A2 10/2007
WO 2008041950 A2 4/2008
WO 2011084431 A2 7/2011
WO 2011/112348 A1 9/2011
WO 2012/075336 A1 6/2012
WO 2012145066 A1 10/2012
WO 2013/067505 A1 5/2013
WO 2015/009411 A1 1/2015

OTHER PUBLICATIONS

Xi, Rongrong et al. Network Threat Assessment based on Alert Verification. 2011 12th International Conference on Parallel and Distributed Computing, Applications and Technologies. https://ieeexplore.ieee.org/stamp/stamp.jsp?tp=&arnumber=6118526 (Year: 2011).*

Ahmed, Taqwa et al. A Taxonomy on Intrusion Alert Aggregation Techniques. 2014 International Symposium on Biometrics and Security Technologies (ISBAST). https://ieeexplore.ieee.org/stamp/stamp.jsp?tp=&arnumber=7013129 (Year: 2014).*

Lastline Labs, The Threat of Evasive Malware, Feb. 25, 2013, Lastline Labs, pp. 1-8.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

(56) References Cited

OTHER PUBLICATIONS

Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 14/985,266, filed Dec. 30, 2015 Non-Final Office Action dated Sep. 22, 2017.
U.S. Appl. No. 14/985,266, filed Dec. 30, 2015 Notice of Allowance dated Apr. 11, 2018.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36TH Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/about.chris/research/doc/esec07.sub.--mining.pdf-.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.iso?reload=true&arnumber=990073, (Dec. 7, 2013).
Abbes, Tarek; Bouhoula, Adel; Rusinowitch, Michael. Protocol Analysis in Intrusion Detection Using Decision Tree. Proceedings of International Conference on Information Technology: Coding and Computing, 2004. ITCC 2004. Pub. Date: 2004.
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

(56) References Cited

OTHER PUBLICATIONS

Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Hjelmvik, Erik , "Passive Network Security Analysis with NetworkMiner", (IN)Secure, Issue 18, (Oct. 2008), pp. 1-100.
Huang, Shin-Ying; Yu, Fang; Tsaih, Rua-Huan; Huan, Yennun. Network-Traffic Anomaly Detection with Incremental Majority Learning. 2015 International Joint Conference on Neural Networks (IJCNN). Pub. Date: 2015.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.

* cited by examiner

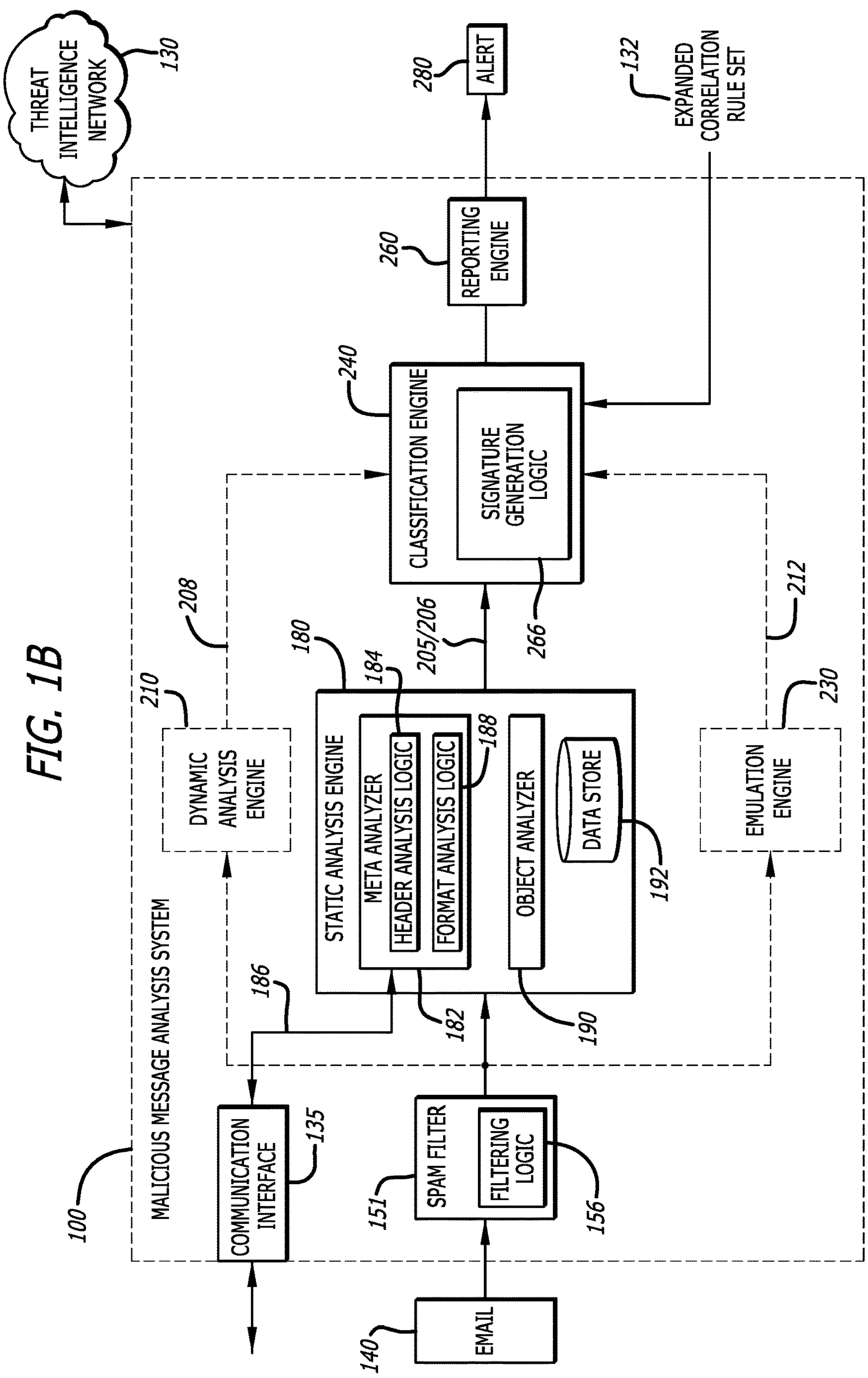
FIG. 1B
THREAT INTELLIGENCE NETWORK
130
ALERT
280
132
EXPANDED CORRELATION RULE SET
REPORTING ENGINE
260
CLASSIFICATION ENGINE
240
SIGNATURE GENERATION LOGIC
266
208
212
205/206
180
184
210
DYNAMIC ANALYSIS ENGINE
STATIC ANALYSIS ENGINE
META ANALYZER
HEADER ANALYSIS LOGIC
FORMAT ANALYSIS LOGIC
188
OBJECT ANALYZER
DATA STORE
192
EMULATION ENGINE
230
MALICIOUS MESSAGE ANALYSIS SYSTEM
186
182
190
100
COMMUNICATION INTERFACE
135
SPAM FILTER
FILTERING LOGIC
151
156
EMAIL
140

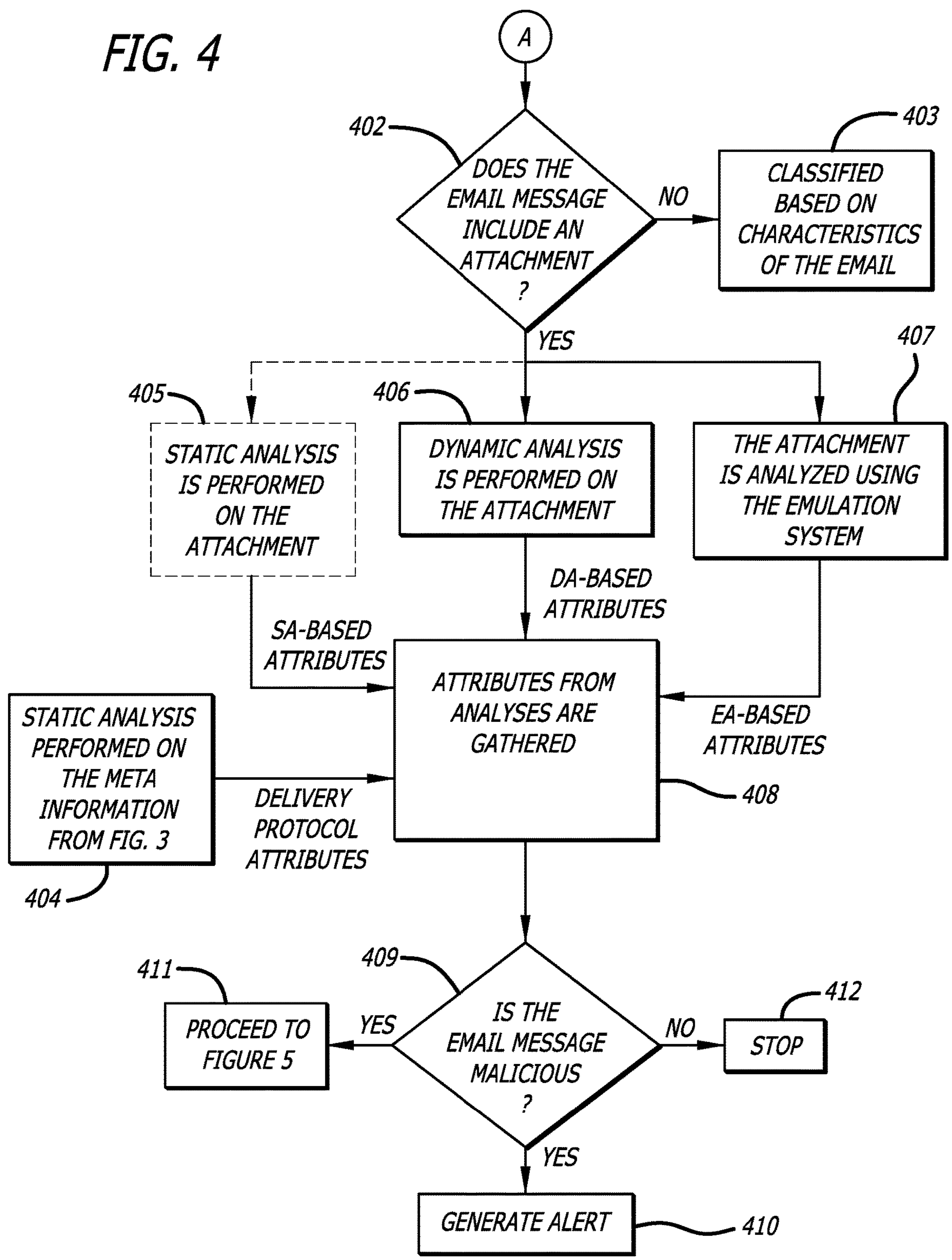
FIG. 4
A
402
DOES THE EMAIL MESSAGE INCLUDE AN ATTACHMENT ?
NO
403
CLASSIFIED BASED ON CHARACTERISTICS OF THE EMAIL
YES
405
STATIC ANALYSIS IS PERFORMED ON THE ATTACHMENT
406
DYNAMIC ANALYSIS IS PERFORMED ON THE ATTACHMENT
407
THE ATTACHMENT IS ANALYZED USING THE EMULATION SYSTEM
DA-BASED ATTRIBUTES
SA-BASED ATTRIBUTES
ATTRIBUTES FROM ANALYSES ARE GATHERED
EA-BASED ATTRIBUTES
STATIC ANALYSIS PERFORMED ON THE META INFORMATION FROM FIG. 3
DELIVERY PROTOCOL ATTRIBUTES
408
404
409
411
PROCEED TO FIGURE 5
YES
IS THE EMAIL MESSAGE MALICIOUS ?
NO
412
STOP
YES
GENERATE ALERT
410

501
EMAIL, OR AT LEAST CERTAIN ASPECTS ARE DETERMINED TO BE MALICIOUS
502
UPLOAD THE EMAIL TO THE THREAT INTELLIGENCE NETWORK
503
CAN THE EMAIL CONTEXT INFORMATION BE USED TO GENERATE A SIGNATURE ?
NO
504
STOP
YES
505
GENERATE SIGNATURE(S)
506
UPLOAD SIGNATURE(S) TO THE THREAT INTELLIGENCE NETWORK
507
DEPLOY SIGNATURE(S) TO ALL RELEVANT CLIENTS

MALICIOUS MESSAGE ANALYSIS SYSTEM

CROSS REFERENCE TO RELATED APPLICATIONS

This application is a continuation of U.S. patent application Ser. No. 14/985,266 filed Dec. 30, 2015, now U.S. patent Ser. No. 10/050,998 issued August 14, the entire contents of which is incorporated herein by reference.

FIELD

Embodiments of the disclosure relate to the field of cyber-security. More specifically, one embodiment of the disclosure relates to a system, apparatus and method configured to determine whether a message is associated with a malicious attack.

GENERAL BACKGROUND

Over the last decade, malicious software has become a pervasive problem for Internet users as many networked resources include vulnerabilities that are subject to attack. For instance, over the past few years, an increasing number of vulnerabilities are being discovered in software that is loaded onto network devices. While some vulnerabilities continue to be addressed through software patches, prior to the release of such software patches, network devices will continue to be targeted for attack by malware, namely information such as computer code that attempts during execution to take advantage of a vulnerability in computer software by acquiring sensitive information or adversely influencing or attacking normal operations of the network device or the entire enterprise network.

Moreover, with the proliferation of the Internet and the reliance on electronic mail (email) as a means of communication, malware is capable of spreading more quickly and effecting a larger subset of the population than ever before. This is especially true because individual users and businesses can receive hundreds or even thousands of emails every day.

Conventional malware detection systems have been developed in an attempt to identify an email as malicious by (i) scanning content of the header and body of the email and (ii) comparing the scanned content with predetermined data patterns. These predetermined data patterns represent data that has previously been identified as being associated with malicious or suspicious activity. Hence, in response to detection of such data within the scanned content of the email, the conventional malware detection systems may block delivery of the email to the targeted recipient. No further analysis of the particular characteristics of the email message is considered as factors (and/or being used to derive the contextual information) in determining whether the email is associated with a malicious attack.

In fact, while some conventional antivirus programs may be configured to scan emails for malware, the methods currently in use may produce "false negative" results because an email may contain a malicious object that is part of a greater, multi-stage attack, but the object may not itself exhibit maliciousness during the scanning process. Consequently, the malicious object may be allowed to pass through to the end user. Also, updating of the scanning patterns is quite labor intensive, especially as more and more scan patterns are needed based on future detections of new types of malicious emails by the conventional malware detection system and perhaps other systems communicatively coupled to the conventional malware detection system. Using a scanning pattern is a reactive solution since these deterministic patterns are issued after analyzing the attack.

Accordingly, a need exists for an improved malicious message detection system, especially to detect potentially malicious suspicious email messages in a proactive manner.

BRIEF DESCRIPTION OF THE DRAWINGS

Embodiments of the invention are illustrated by way of example and not by way of limitation in the figures of the accompanying drawings, in which like references indicate similar elements and in which:

FIG. 1B is an alternative, exemplary block diagram of the MMA system of FIG. 1A.

FIG. 4 is a flowchart of an exemplary method for analyzing whether an email message is associated with a malicious attack considering delivery protocol attributes.

DETAILED DESCRIPTION

Figure 1A:
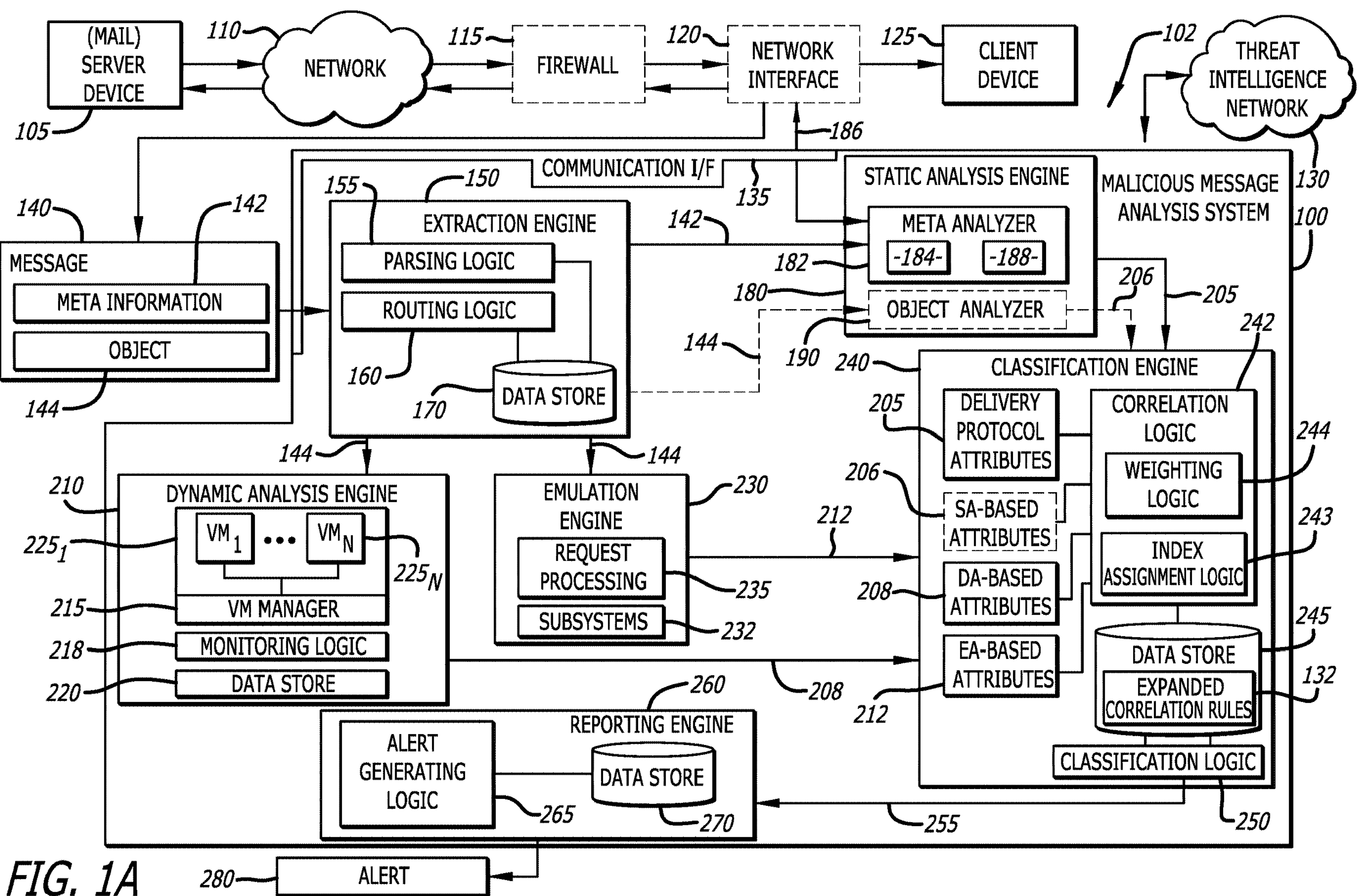
FIG. 1A is an exemplary block diagram of a communication system deploying a Malicious Message Analysis (MMA) system via a network.

Embodiments of the present disclosure generally relate to a Malicious Message Analysis (MMA) system configured to detect whether a message is associated with a malicious attack, and especially electronic mail (email) messages provided in accordance with any suitable delivery protocol (e.g., Simple Mail Transfer Protocol "SMTP", Internet Message Access Protocol "IMAP", etc.). Such detection may involve an analysis of content recovered from the header and/or body portions of the message, where the analysis is configured to detect one or more suspicious characteristics associated with the message. The suspicious characteristics (sometimes referred to as "delivery protocol attributes") are provided to correlation logic, which considers the delivery protocol attributes in determining a likelihood (threat index) of the message being associated with a malicious attack (e.g., including malware, operating with malware, etc.).

According to one embodiment of the disclosure, the "message" analysis may be conducted by accessing meta information in the "FROM" header field to determine a source of the message. By way of a non-limiting example, in the event that the source is associated with a domain name, the MMA system may conduct an analysis of the domain name against known malicious domain names (hereinafter, "domain blacklist") and, optionally, known benign domain names ("domain whitelist"). In the event that the domain name is not part of the domain blacklist (or the domain whitelist), the MMA system may initiate an attempt to communicate with a server associated with the domain name to confirm legitimacy of the sender (i.e. the sender of the message is accurately identified in the message). This communication may involve SMTP handshaking session to determine if the sender is found as being a member of the domain. The lack of sender verification may be represented as a delivery protocol attribute that is provided to the correlation logic and may operate as a strong indicator with respect to maliciousness of the message.

Hence, in some instances, the delivery protocol attributes may be outcome determinative. However, in other instances, the delivery protocol attributes are not outcome determinative. When an object, such as an attachment (e.g., file, document, etc.) or embedded content (e.g., URL, script, macro, etc.) is included with the message, a contextual analysis may be conducted on the delivery protocol attributes, along with attributes produced by one or more analyses on the object, in order to detect whether the message is malicious. The different types of analyses conducted on the object may include (i) behavioral analysis that is conducted by analyzing the behavior of a virtual machine during execution of the object, (ii) a static analysis in which the content of the object is analyzed without opening or execution of the object, and/or (iii) emulated processing of the object. Based on the combination of attributes and the correlation rules that denote malicious tendencies, the MMA system determines whether the message should be classified as malicious (i.e. the message is associated with a malicious attack).

With respect to the contextual analysis, it is contemplated that the attributes (results) from one type of analysis may be considered with attributes (results) from another type of analysis. More specifically, according to one embodiment of the disclosure, delivery protocol attributes may be combined with attributes produced by any one or more of the behavioral, static or emulation analyses to determine whether the message is associated with a malicious attack. It is contemplated that some of the attributes, namely (i) certain anomalous meta information pertaining to the email message itself, (ii) detected characteristics of the object (e.g., static analysis), and/or (iii) one or more monitored behaviors during a behavioral analysis of the object (e.g., the dynamic analysis), may be aggregated to form the context information. At least a portion of the context information is analyzed to determine whether the message is associated with a malicious attack.

Once maliciousness has been confirmed with regard to the message, an alert is generated. The alert (e.g., a type of messaging including text message or email message, a transmitted displayable image, or other types of information transmitted over a wired or wireless communication path) may provide a warning to a security administrator that an incoming message is malicious. In one embodiment, if maliciousness is found, the entire message may be blocked. Alternatively, if maliciousness is only found with respect to one aspect of a message, then that aspect may be blocked so that only non-malicious aspects of the message are passed through to an end user.

I. Terminology

In the following description, certain terminology is used to describe features of the invention.

In certain situations, both terms "logic," "engine" and "component" are representative of hardware, firmware and/or software that is configured to perform one or more functions. As hardware, logic (or logic system or engine or component) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or logic system or engine or component) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "computerized" generally represents that any corresponding operations are conducted by hardware in combination with software and/or firmware.

The term "message" generally refers to information transmitted as information in a prescribed format and in accordance with a suitable delivery protocol (STMP, IMAP, POP, etc.), where each message may be in the form of one or more packets, frames, Session Initiation Protocol (SIP) or another messaging transmission, TCP, UDP, or IP-based transmissions, or any other series of bits having the prescribed format. Messages may include, by way of non-limiting example, email messages, text messages, and the like.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of a network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

In certain instances, the term "detected" is used herein to represent that there is a prescribed level of confidence (or probability) on the object or message being malicious as including malware and/or being associated with a malicious attack. Also, the terms "compare" or "comparison" generally mean determining if a match (e.g., a certain level of correlation) is achieved between two items where one of the items may include a particular pattern.

The term "network device" should be construed as any electronic device with the capability of connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, standalone appliance, a router or other intermediary communication device, etc.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Malicious Message Analysis Methodology

A. General Architecture of a Network Device Deploying a Malicious Message Analysis System Referring to FIG. 1A, an exemplary block diagram of a communication system 102 that features a Malicious Message Analysis (MMA) system 100 that is communicatively coupled to a network 110 via an optional firewall 115 and/or an optional network interface 120. Communications between a (mail) server device 105 and a client device 125 may be analyzed by the MMA system 100. The MMA system 100 is communicatively coupled to a threat intelligence network 130 to receive an updated correlation rule sets 132.

According to the embodiment illustrated in FIG. 1A, the MMA system 100 may be configured as a network device that is adapted to analyze messages that are part of network traffic, in particular electronic mail (email) messages, routed over the network 110 between the mail server device 105 and at least one client device 125. The communication network 110 may include a public network such as the Internet, in which case an optional firewall 115 (represented by dashed lines) may be interposed on the communication path between the public network and the client device 125. Alternatively, the network 110 may be a private network such as a wireless data telecommunication network, a wide area network, any type of local area network (e.g., LAN, WLAN, etc.), or a combination of networks.

As shown, the MMA system 100 may be communicatively coupled with the communication network 110 via the network interface 120. In general, the network interface 120 operates as a data capturing device (sometimes referred to as a "tap" or "network tap") that is configured to receive data propagating to/from the client device 125 and provide at least some of this data to the MMA system 100. Alternatively, the MMA system 100 may be positioned in-line with client device 125. For this embodiment, network interface 120 may be contained within the MMA system 100 operating as a communication interface 135.

According to one embodiment of the disclosure, the network interface 120 is capable of receiving and routing network traffic to the MMA system 100. The network interface 120 may provide the entire traffic or a certain subset of the network traffic, for example, such as an email message along with an object such as an attachment or embedded content.

As further shown in FIG. 1A, the MMA system 100 includes a communication interface 135, an extraction engine 150, a static analysis engine 180, a dynamic analysis engine 210, an emulation engine 230, a classification engine 240, and a reporting engine 260. It should be appreciated that the extraction engine 150, the static analysis engine 180, the dynamic analysis engine 210, the emulation engine 230, the classification engine 240, and the reporting engine 260 may each be separate and distinct components, although these engine (and any logic thereof) may also be implemented as a single software module or functionality residing on data processing circuitry such as a processor or a processor core.

In the interest of clarity, reference will now be made to an exemplary message 140, which in one embodiment may refer to an email message. However, it should be understood that the message 140 may come in various forms and types as defined above.

In general, the email message 140 includes meta information 142 and optionally, one or more objects 144 (referred to as "object"). As discussed herein, the meta information 142 includes content associated with any of a plurality of header fields as well as the body of the email message 140. Examples of the meta information 142 within the header fields may include, but are not limited or restricted to the following: (a) the "delivery-date"—the date the email message was delivered; (b) the "date"—the date the email message was sent; (c) the "message-ID"—the ID of the email; (d) the "X-Mailer"—information identifying the original messaging application and version; (e) the "from" field—message's source information/address; (f) the "to" field—message's destination information/address; and/or (g) the "subject"—the title and ancillary source information that may be used for alias mismatching. Similarly, the object 144 may include a file (e.g., Hypertext Markup Language "HTML" file, etc.), document, executable program macro, embedded script, or Uniform Resource Locator (URL) as defined herein.

Once the email message 140 is captured from the network traffic, it is communicated to the extraction logic 150 of the MMA system 100 via the communication interface 135 (e.g., one or more ports, network interface card, wireless transceiver, etc.). In some embodiments, as shown in FIG. 1A, the extraction logic 150 receives the email message 140 for parsing, prior to being routed to one or more analysis systems, such as static analysis engine 180, the dynamic analysis engine 210, and/or emulation engine 230 for example.

More specifically, the extraction logic 150 including parsing logic 155 that is configured to extract the meta information 142 and object 144 from the email message 140. Thereafter, the meta information 142 of the email message 140 may be communicated to routing logic 160 and forwarded to the static analysis engine 180. The object 144 may be communicated to routing logic 160 and forwarded to the static analysis engine 180, dynamic analysis engine 210, and/or the emulation engine 230. A data store 170 may also be used to provide local storage for extraction analysis and rules, as well as operate as a local log.

As shown in FIG. 1A, in general terms, the static analysis engine 180 inspects the meta information 142 and object 144 for anomalies in characteristics such as formatting and patterns associated with known malware using, for example, heuristic, probabilistic, and/or machine-learning analysis schemes. Herein, the static analysis engine 180 includes a meta analyzer 182 and object analyzer 190.

According to one embodiment of the disclosure, the meta analyzer 182 within the static analysis engine 180 may be configured to conduct one or more analyses on particular meta information 142 of the email message 140 (sometimes referred to as "message scanning"). As shown, the meta analyzer 182 features at least (network) header analysis logic 184 and format analysis logic 188. The header analysis logic 184 is configured to determine the legitimacy of the source of the message 140, legitimacy of the mail server (i.e. the sender of the message is accurately identified in the message 140 so as to not deceive the recipient as to origin). This validation by the network header analysis logic may be performed by making an outbound network communication. The format analysis logic 188 is configured to determine format violations in header fields based on corresponding message format specifications, and also has probabilistic, heuristic algorithm to determine the deviation of the header field from the normal headers delivering non-malicious attachments or URL. The Format analysis logic does not make any outbound network communication.

As an illustrative example, the header analysis logic 182 may access meta information associated with the "FROM" header field of the email message 140, to determine its source. When the source is associated with a domain name (e.g., top-level domain and lower-level domain—abc.com), which may be represented as an email address (i.e. name@abc.com, name@abc.net, etc.) for example, the header analysis logic 184 may conduct a preliminary analysis of an identifier of the source against known malicious source identifiers. For instance, the preliminary analysis may include a comparison of the domain name associated with the source of the message 140 (e.g., a combination of the top-level and lower-level domains) against known malicious domain names (hereinafter, "domain blacklist"). Alternatively, the preliminary analysis may include a comparison between the email address identified in the email message 140 as the source against known malicious email addresses (hereinafter, "email blacklist"). As an option, the header analysis logic 184 may conduct a comparison of the domain name against known benign domain names ("domain whitelist") or the email address against known benign email addresses ("email whitelist"). These source identifiers may be maintained in a data store as shown in FIG. 1B.

In the event that the domain name (or email address) is not part of the domain blacklist (or email blacklist) as well as the domain whitelist (or email whitelist) when utilized, the header analysis logic 184 may attempt to establish communications 186 with the mail server 105 associated with the source of the message 140 to confirm that the sender of the message 140 is correctly identified. The message exchange for such communications 186 may vary, depending on the delivery protocol for the message 140 (e.g., SMTP, IMAP, POPS, etc.).

As a non-limiting, illustrative example, in accordance with SMTP handshaking communication session, where the mail server 105 is a SMTP mail server, a DNS request message with the domain name at issue as a parameter is transmitted. This prompts a return of a DNS response message that will resolve the IP address of the mail server 105 responsible for message transmissions from the domain. Thereafter, the header analysis logic 184 may issue a command (e.g., HELO command) to the mail server 105 to initiate an SMTP session that is acknowledged by the mail server 105 (e.g., SMTP response code 250 that identifies the command has completed successfully).

A SMTP command (Mail From) message identifies to the mail server 105 that a new mail transition is starting, where a response code 250 is provided to identify that the address provided by the header analysis logic is accepted. Thereafter, a SMTP command (RCPT To) message is sent that identifies an email address of the intended recipient, which is selected as the source of message 140. If the recipient is not found to be a member of the domain, which denotes a bounce-back condition, the header analysis logic 184 receives a SMTP response code 550. The detection of this response code signifies that the source is not legitimate and a delivery protocol attribute is generated to denote that the message 140 was issued by a non-verified source and provided to the classification engine. An exemplary command-response flow of a SMTP handshaking communication session, which results in a "Recipient not found" attribute, is shown below:

220 smtp01-01.secureserver.net bizsmtp ESMTP server ready HELO [190 .#.#.#]

250 smtp01-01.secureserver.net hello [#.#.#.#], pleased to meet you MAIL FROM:<address>

250 2.1.0<address> sender ok

RCPT TO:<name@abc.com>

550 5.1.1<name@abc.com> Recipient not found. <http://x.co/irbounce> QUIT 221 2.0.0 smtp01-01.secureserver.net bizsmtp closing connection Additionally, the meta analyzer 182 comprises format analysis logic 188 that compares formatting of the header fields in the message 140 to header field requirements in accordance with message formatting requirements for the delivery protocol. For instance, the absence of a "FROM" header field may be a format violation in accordance with the SMTP delivery protocol messaging specification. As another example, the absence of a "CC" field may be a format violation in accordance with IMAP delivery protocol messaging specification. The format violations (as well as the compliance) may be provided as delivery protocol attributes to the classification engine 240. The format analysis logic 188 also has probabilistic, heuristic, machine learning logic (not separately depicted) to determine if the header fields are deviated from the normal messages. For instance, there is no email address in the "TO" field, "CC" field and there is an address in the "BCC" field. This characteristic is a deviation from the normal characteristics. Another instance can use-based logic (again, not separately depicted), which determines if the email server is different from the alias, which the sender's email may feature in the "FROM" field of the message.

According to one embodiment of the disclosure, the attributes from the analysis of the meta information 142, such as the legitimacy of the source of the message 140 based on content associated with the "FROM" header field and/or formatting violations, output of the probabilistic, heuristic, machine learning logic detected for the message 140 in accordance with its delivery protocol for example, may be provided as delivery protocol attributes 205 to the classification engine 240. Of course, other anomalous characteristics detected during analysis of the meta information 142 may be provided as part of the delivery attributes 205.

Referring still to FIG. 1A, the object analyzer 190 of the static analysis engine 180 may also be configured to analyze the object 144, where such analyses may include, but are not limited or restricted to, analysis of one or more characteristics (hereinafter "characteristic(s)") associated with the object 144, such as the object's name, object type, size, path, or the like. Additionally or in the alternative, the object analyzer 190 may analyze the object 144 by performing one or more checks. An example of one of these checks may include one or more signature checks, which may involve a comparison of (i) content of the object 144 and (ii) one or more pre-stored signatures associated with previously detected malware. In one embodiment, the check may include an analysis to detect for exploitation techniques, such as any malicious obfuscation, using for example, probabilistic, heuristic, and/or machine-learning logic. According to this embodiment of the disclosure, the extracted characteristic(s) may also be provided as static analysis (SA)-based attributes 206 to the classification engine 240 for subsequent contextual analysis.

It is envisioned that information associated with the object 144 may be further analyzed using the dynamic analysis engine 210. Herein, the dynamic analysis engine 210 includes a virtual machine manager 215, monitoring logic 218, a data store 220, and one or more virtual machines (VMs) illustrated at 225$_1$-225$_N$ (N>1). The VMs 225$_1$-225$_N$ are configured to perform in-depth dynamic (behavioral) analysis on the object 144 during processing in efforts to detect one or more anomalous behaviors. In general terms, the dynamic analysis engine 210 is adapted to process the object 144 within one or more VMs (e.g., $VM_1$-$VM_N$) that simulate a run-time environment expected by the object 144, where the behaviors of the VMs are monitored by the monitoring logic 218 and may be stored within the data store 220.

In one embodiment, each of the one or more VMs 225$_1$-225$_N$ within the dynamic analysis engine 210 may be configured with a software profile corresponding to a software image stored within the data store 220 that is communicatively coupled with the virtual machine manager 215. Alternatively, the VMs (e.g., $VM_1$-$VM_N$) may be configured according to a prevalent software configuration, software configuration used by a network device within a particular enterprise network (e.g., client device 125), or an environment that is associated with the object to be processed, including software such as a web browser application, PDF™ reader application, data processing application, or the like.

According to one embodiment, it is contemplated that the extraction logic 150 may further include processing circuitry (not shown) that is responsible for extracting or generating metadata contained within or otherwise associated with email message 140 from the parsing logic 155. This metadata may be subsequently used by the virtual machine manager 215 for initial configuration of one or more VMs 225$_1$-225$_N$ within the dynamic analysis engine 210, which conducts run-time processing of at least some of the object 144 information associated with the email message 140.

As further shown in FIG. 1A, the object 144 may be further analyzed using the emulation engine 230, which is configured so as to enable the MMA system 100 ("host" system) to behave like any another computer system ("guest" system). It is envisioned that the emulation engine 230 may be configured so as to enable the host system to run any of various software, applications, versions and the like, designed for the guest system. More specifically, under control of request processing logic 235, the emulation engine 230 may be configured so as to model hardware and software. As such, the emulation engine 230 may be divided into logic each corresponding roughly to the emulated computer's various systems, and as a result, the emulation engine 230 includes subsystems 232. In one embodiment, the subsystems 232 include any of various processor emulator/simulators, a memory subsystem module, and/or various I/O devices emulators.

Furthermore, using the emulation engine 230, certain artifacts that may be specific to (even unique with respect to) a type of known malware attack may be analyzed. For example, emulation engine 230 may also consider propagation mechanisms of an object 144, to determine how instructions and/or behaviors associated with the object 144 communicate or navigate across and/or through a network, for example. According to this embodiment of the disclosure, the results of the emulation engine 230 may be provided as emulation analysis (EA)-based attributes 212 to the classification logic 240 for subsequent analysis.

It should be understood that some or all of the logic and engines set forth in FIG. 1A may be implemented as hardware or one or more software modules executed by the same processor or different processors. These different processors may be located within the same processor package (e.g., different processor cores) and/or located at remote or even geographically remote locations that are communicatively coupled (e.g., by a dedicated communication link) or a network. Also, some or all of the logic and engines set forth in FIG. 1A may be implemented as part of cloud services.

Referring now to FIG. 1B, an alternative embodiment of the MMA system 100 of FIG. 1A is shown. Once the email message 140 is captured from the network traffic, it may be communicated to a spam filter 151, which may be configured to be substantially similar to the extraction logic 150 as shown in FIG. 1A. In some embodiments, as shown in FIG. 1B, the spam filter 151 includes filtering logic 156, which is configured to specify a plurality of conditions consistent with malware, and to take appropriate actions thereto, which may involve, for example, further matching, blocking, and/or selective filtering. In one embodiment, after the email message 140 is analyzed by the spam filter 151, an analysis is performed using the static analysis engine 180.

In one embodiment, the static analysis engine 180 in FIG. 1B is substantially similar to the system of FIG. 1A, which illustrates a data store 192 to maintain, for example, a list of identifiers identifying a set of known malicious sources such as domains or email addresses that have invokes previously detected malicious attacks (e.g., black list) and a set of known sources that are considered reliable sources (e.g., white list). The list of identifiers may be used by header analysis logic 184 to determine the legitimacy of the sender of the message 140.

Herein, the list of identifiers may be collected based on prior malware detection and periodically updated from a centralized server, or the threat intelligence network 130, for example. If the email message 140 is identified as one of the matched identifiers in the list, the email message 140 may be classified immediately using the classification engine 240, as either malware or non-malware, without having to perform a further analysis. It is contemplated that the data store 192 may further include message formatting requirements, heuristic probabilistic, machine learning logic (e.g., computer instructions) for one or more delivery protocols (e.g., SMTP, IMAP, POP3, etc.) for use by format analysis logic 188 to determine delivery protocol attributes 205 associated with formatting anomalies and/or determine the deviation of the headers from the normal header.

In one embodiment, based on the attributes 205, 206, 208 and/or 212, certain signatures such as blocking signatures may be generated and stored using the signature generation logic 266. In the event that further analysis is required, data associated with the email message 140 may be analyzed by the dynamic analysis engine 210, and/or the emulation engine 230, as discussed herein.

Referring to FIGS. 1A-1B, it is important to note that the various analyses as discussed herein may be performed in a concurrent (i.e., at same time or in an overlapping manner) or serial fashion, without limitation. As such, the various analyses do not each need to be complete prior to being analyzed by any other subsystem. For example, the dynamic analysis may be performed prior to, or during the static analysis. Thus, it is envisioned that the context information, namely delivery protocol attributes from the message analysis (header and/or body of email message 140) along with attributes associated with the static analysis (of object 144), dynamic analysis (of object 144), and/or emulation (of object 144), may be analyzed.

For example, once an email message 140 is received by the MMA system 100, the meta information 142 associated with the message 140 may be analyzed by the meta analyzer 182 with the static analysis engine 180. In response to detecting anomalous characteristics associated with the message 140 (e.g. sender incorrectly identified in the message 140, formatting irregularities, etc.), the meta analyzer 180 provides delivery protocol attributes 205 to the correlation logic 242 of the classification engine 240. The delivery protocol attribute 205 may be considered in the classification of the message 140 as malicious or non-malicious when the expanded correlation rule set 132 includes rules that take the presence or absence of certain delivery protocol attributes 205 into account. As such, an alert 280 may be generated by the reporting engine 260 based, at least in part, on the delivery protocol attributes 205.

As another example, once an email message 140 including the object is received by the MMA system 100, the object 144 may be analyzed by the dynamic analysis engine 210. In one embodiment, a portion of the DA-based attributes 208 from the dynamic analysis engine 210 may be determined, by the classification engine 240, to be dispositive with respect to a finding of maliciousness. As such, the alert 280 may be generated by the reporting engine 260 based on the results of the dynamic analysis engine 210 alone.

However, in the event that the portion of the DA-based attributes 208 is not dispositive, in accordance with expanded correlation rule set 132, the classification engine 240 may determine whether the email message 140 is associated with a malicious attack based on the presence (or even absence) of one or more delivery protocol attributes 205. The combination of these attributes corresponds to context information, where a portion of the context information may be analyzed to determine whether the email message 140 is associated with a malicious attack.

Of course, it is envisioned that none, some or all of these analyses may be operating concurrently where, during the dynamic analysis, some of the delivery protocol attributes 205 or SA-based attributes 206 may be provided.

B. General Classification Methodology with Respect to the Plurality of Analyses

Referring back to FIG. 1A, according to one embodiment of the disclosure, the results from each of the analyses are routed to the classification engine 240 for further processing. More specifically, the delivery protocol attributes 205, the SA-based attributes 206, the DA-based attributes 208 and/or the EA-based attributes 212 are communicated to the classification engine 240. It is envisioned that the correlation logic 242, operating in accordance with the expanded correlation rule set 132, may assign a threat index value to particular attributes and/or particular combinations of attributes (from the same or different analyses). The threat index values may be used to determine a threat index for the email message 140, which indicates whether or not the message 140 is malicious.

As briefly described above, the classification engine 240 determines a threat index associated with the email message 140 that is under analysis. The threat index may be used to represent, at least in part, (i) a score that corresponds to a likelihood of the message 140 being malicious (e.g., message 140 includes malware or is part of a malicious attack); (ii) a policy violation caused by the receipt of the message 140 (or the object 144 provided with the message 140); or (iii) a severity of a potential malicious attack by the message 140. Hence, when the threat index exceeds a prescribed threshold value, the message 140 is considered to be malicious.

More specifically, the classification engine 240 includes correlation logic 242 that operates in accordance with the expanded correlation rule set 132. The correlation logic 242 is configured to receive attributes 205 and/or 206, 208 or 212. The correlation logic 242 attempts to correlate some or all of the attributes 205, 206, 208 and/or 212 associated with the email message 140 in accordance with the expanded correlation rule set 132, which is stored in correlation rules data store 245. For this embodiment, the correlation determines what particular attributes and/or combination of attributes, including the delivery protocol attributes 205, have been collectively detected by the static analysis engine 180, dynamic analysis engine 210 and/or emulation engine 230 in accordance with the attribute patterns set forth in the expanded correlation rule set 132, which may be preloaded at manufacturer and periodically or a periodically updated. By way of non-limiting example, the expanded correlation rule set 132 may cause the index assignment logic 243 and the weighting logic 244 of the correlation logic 242 to set the threat index values and corresponding weighting for a portion of the context information (e.g., selective attributes), which is used by the classification logic 250 to calculate a threat index 255, which denotes a likelihood of the email message 140 being associated with a malicious attack.

According to one embodiment of the disclosure, each attribute and/or combination of attributes may be associated with a threat index value (and optionally a weighting), where the summation of these threat index values is used to determine maliciousness. An illustrative example of the threat index 255 computed in accordance with a particular correlation rule (attribute pattern) is shown in equation (1):

$$\text{Threat index}_{255}=\Sigma_{MI}[W_1(\text{delivery protocol attribute\_1})+W_2(\text{EA-based attribute\_2})+W_3(\text{delivery protocol attribute\_3 \& DA-based attribute\_4 \& SA-based attribute\_6})+W_4(\text{delivery protocol attribute\_5 \& no SA-based attribute\_6})] \quad (1)$$

According to this illustrative example, the threat index 255 may be computed by a combination of threat index values associated with any or all of the following: particular attributes (delivery protocol attributes_1, EA-based attribute_2) of the context information, combinations of attributes that are present (delivery protocol attribute_3 & DA-based attribute_4), and/or combinations of attributes where some attributes are absent (delivery protocol attribute_5 & no SA-based attribute_6). These particular attributes (e.g., attribute_1 to attribute_6) may be from different analyses and only some (not all) of the attributes from these different analyses are used to determine the threat index 255.

Optionally, the weighting factors ($W_1$, $W_2$, . . . ) may be used to place higher probative likelihood of maliciousness for certain attributes or even combinations of attributes.

Consequently, each of the weighting factors ($W_1 \ldots W_N$) may be tailored specifically for certain types of malware campaigns, analysis system result, or the like, without limitation. It is envisioned that in one embodiment, no weighting factors are included when determining the threat index 255.

Of course, as another illustrative example, the threat index 255 may be an aggregation of attribute scores across a plurality of analyses, as set forth below:

$$\text{Threat index}_{255}=\Sigma_{MI}[(\text{Delivery Protocol attributes}_{205})+(\text{SA-based attributes}_{206})+(\text{DA-based attributes}_{208})+(\text{EA-based attributes}_{232})] \quad (2)$$

As set forth in equation (2), the threat index 255 may be computed by a threat index based on a combination of threat index values associated with particular attributes of the context information formed by portions of the delivery protocol attributes 205, SA-based attributes 206, DA-based attributes 208, and/or the EA-based attributes 212. Optionally, the threat index may be weighted by weighting logic 244.

The combination of threat index values as discussed herein is tailored to specific attributes to determine maliciousness with respect to the email message 140, thereby reducing false negative results as well as false positives. For example, an email message featuring an incorrectly identified source in the "FROM" header field (attribute_3–delivery protocol) that is observed with 'callback' (i.e., attempt to send an outbound communication) to an outside source (attribute_4–DA-based) and an attachment less than 10 kilobytes (attribute_6–SA-based) may be more indicative of an advanced malicious attack, as compared to considering only the attachment size (attribute_6) and the callback behavior (attribute_4), which may produce a false negative result. By combining of context information associated with different analysis types, the APT attack may be detected more accurately, for example. Similarly, the presence of a deployment attribute that identifies that the source is correctly identified in the message (attribute 7), combined with the attachment size (attribute_6) and the callback behavior (attribute 4) may reduce the threat index to avoid a false positive result.

Once the threat index 255 has been computed, it is compared with a predetermined threshold value that is used to determine whether or not an alert should be generated. In one embodiment, the predetermined threshold value may represent, perhaps numerically, an aggregate value based on a consideration of, for example, certain incidences, feature sets, vulnerabilities, and/or attack signatures specific to any of various malware attacks. However, it is envisioned that the predetermined threshold value may be variable, depending on any of various factors, including by way of non-limiting example, the geographical or industry-type information regarding the most recent, and/or previously targeted parties. Accordingly, it should be understood that the predetermined threshold value might vary for different types of attacks.

Alternatively, in lieu of reliance on a score as the threat index to determine whether an email message is malicious, the classification engine 240 includes correlation logic 242 that operates in accordance with the expanded correlation rule set 132 that identify context information of known maliciousness and of known non-maliciousness. Hence, unlike a scoring mechanism, the matching of certain attributes recovered from different types of analyses to the malicious (or non-malicious) context provided by the correlation rules may be used to determine whether or not the email message 140 is associated with a malicious attack. Accordingly, in some embodiments, the classification may be based on a non-quantified assessment of threat risk based on the analysis results.

For example, a file (object) 144 is part of an attachment for an incoming email message 140 under analysis. The object analyzer 190 determines that the file 144 is obfuscated (characteristic_1) while the meta analyzer 182 determines that the source of the email message 140 differs from the source enumerated in the email message (sender verification failed). Furthermore, the dynamic analysis engine 210 determines that an HTTP GET request is generated by the file 144 (behavior_1). In accordance with the context information (characteristic_1, sender verification failed, behavior_1) matching malicious content as provided by a correlation rule within the expanded correlation rule set 132 that identifies a collection of context information found to be malicious, the file 144 (and hence the email message 140) is determined to be associated with a malicious attack.

In the event that the threat index 255 meets or exceeds the predetermined threshold value (or the comparison of context denotes maliciousness), the alert generation logic 265 of the reporting engine 260 is signaled to generate the alert 280. The alert 280 (e.g., an email message, text message, display screen image, etc.) may be routed to a network device utilized by a network administrator or a threat intelligence network 130, for example. The reporting engine 260 may be configured so as to store the results from the analysis conducted by the classification engine 240 in the data store 270 for future reference.

Figure 2:
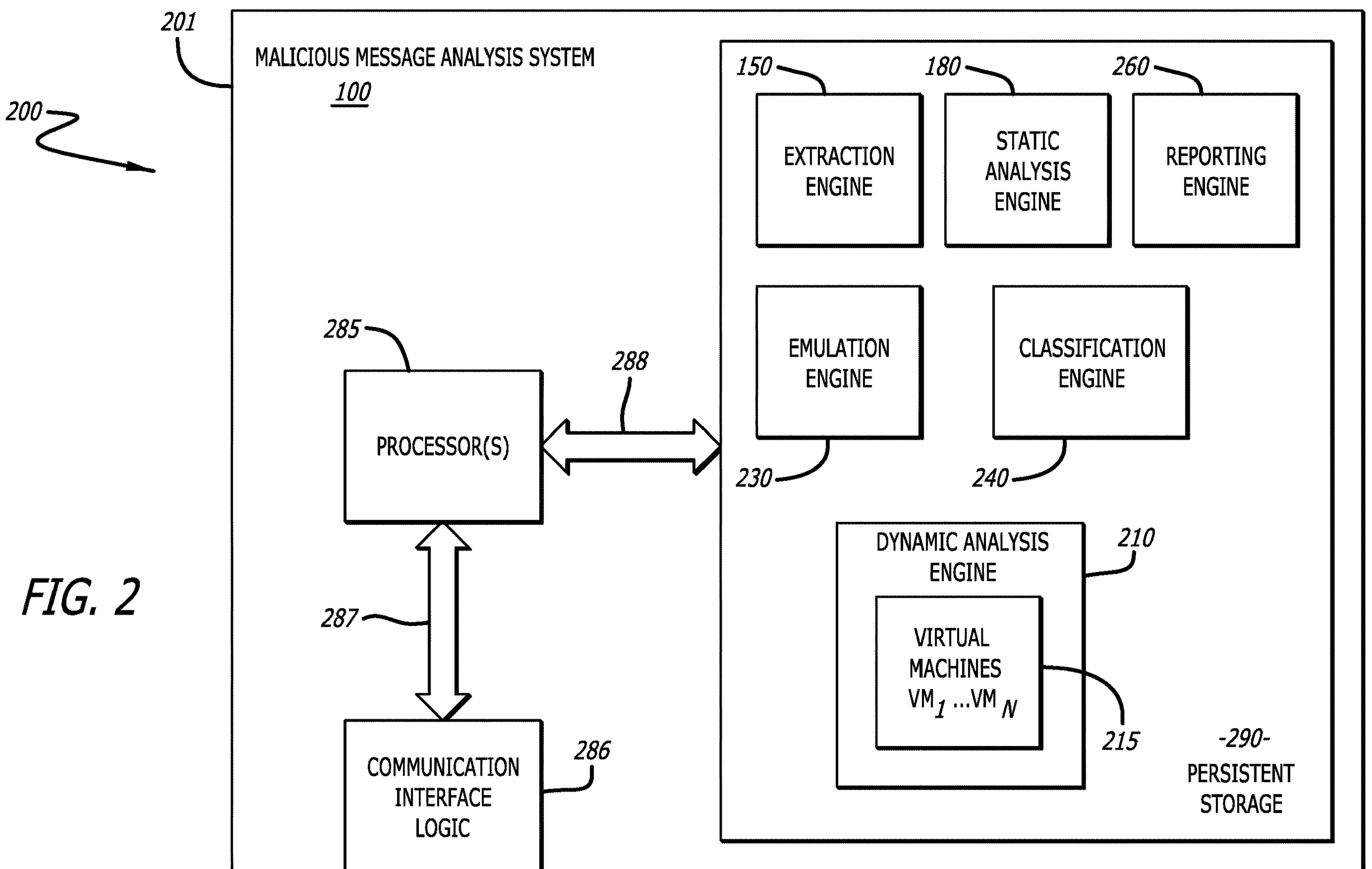
FIG. 2 is an exemplary embodiment of a logical representation of the MMA system of FIG. 1A.

Referring now to FIG. 2, an exemplary embodiment of a logical representation of the MMA system 100 of FIGS. 1A-1B is shown. In one embodiment, a network appliance 200 includes a housing 201, which is made entirely or partially of a rigid material (e.g., hardened plastic, metal, glass, composite or any combination thereof) that protect circuitry within the housing 201, namely one or more processors 285 that are coupled to communication interface logic 286 via a first transmission medium 287. Communication interface logic 286 enables communications with other MMA systems and/or the threat intelligence network 130 of FIG. 1A, for example. According to one embodiment of the disclosure, communication interface logic 286 may be implemented as a physical interface including one or more ports for wired connectors. Additionally, or in the alternative, communication interface logic 286 may be implemented with one or more radio units for supporting wireless communications with other electronic devices.

Processor(s) 285 may further be coupled to persistent storage 290 via a second transmission medium 288. According to one embodiment of the disclosure, persistent storage 290 may include the MMA system 100, which in one embodiment includes the extraction logic 150, the static analysis engine 180, the dynamic analysis engine 210, the emulation engine 230, the classification engine 240, and the reporting engine 260 as described above. It is envisioned that one or more of these systems could be implemented externally from the MMA system 100 without extending beyond the spirit and scope of the present disclosure. For instance, the dynamic analysis engine 210 may be located within cloud services.

Figure 3:
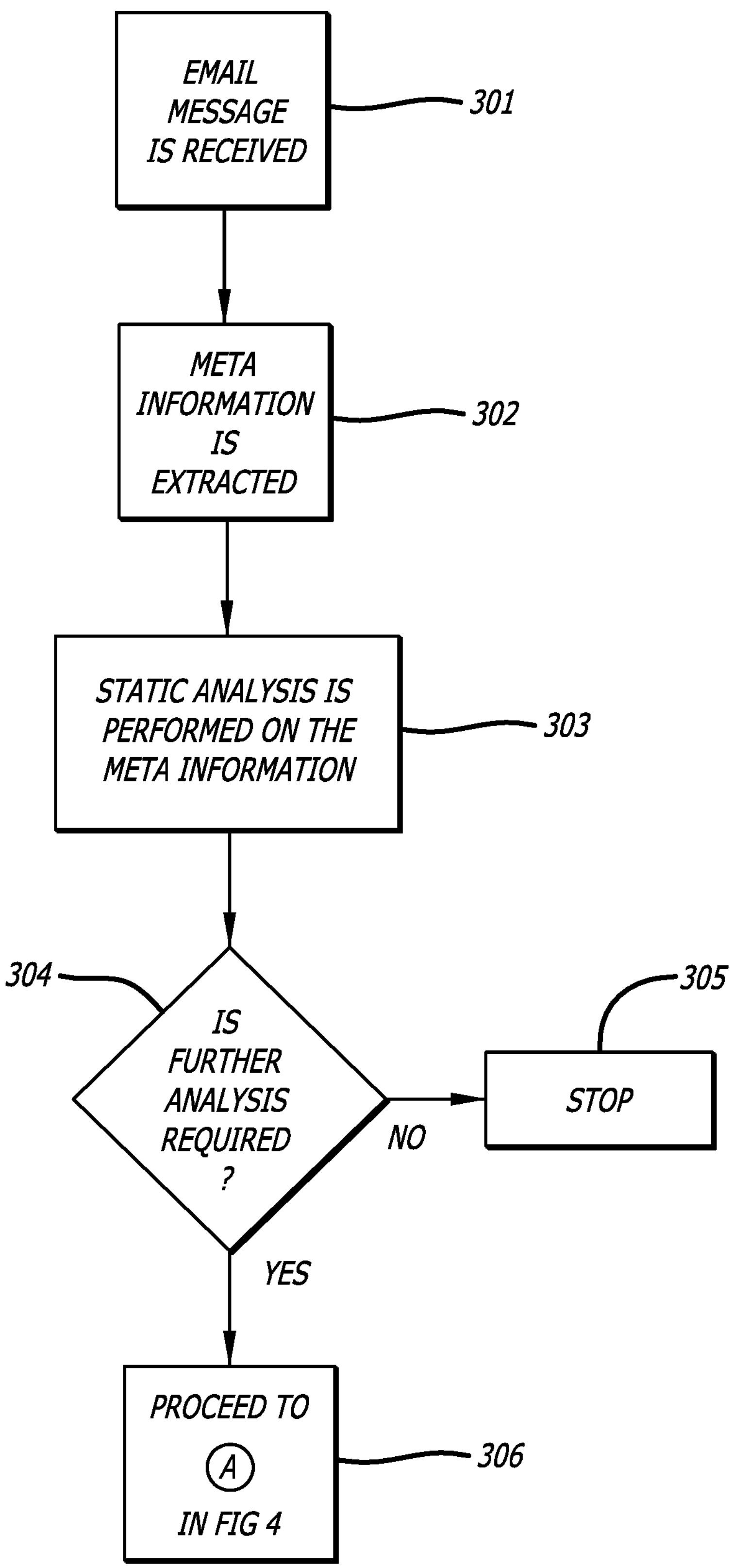
FIG. 3 is a flowchart of an exemplary method for analyzing context information based on a delivery protocol attributes.

Referring now to FIG. 3, a flowchart of an exemplary method for providing warning of a potential email-based attack on a system or device based on a real-time analysis. In block 301, an email message is received and routed to the meta analyzer within the exemplary MMA system 100. At block 302, meta information is extracted and routed to the static analysis engine for further analysis. At block 303, static analysis is performed on the meta information within one or more header fields of the email message.

For example, using the meta analyzer within the static analysis engine, a determination may be made as to the legitimacy of the source of the email message, which may include an attempted handshake scheme being conducted to determine if the source is identified by the source address included in the email message. A lack of legitimacy, namely a lack of IP address verification (IP address redirection) and/or any alias mismatching (e.g., source identified in the subject field is inconsistent with the actual source) provides a strong indication that the email message is malicious.

At block 304, a determination is made with respect to whether further analysis is required. For instance, meta information of the email message may be compared with previously known email message attacks, malicious attribute sets, attack signatures, etc. so as to determine maliciousness. For example, the occurrence of a known alias mismatch, a particular subject line, or certain body content of an email message may indicate to some level of probability, often well less than 100%, that the email message includes a certain exploit or exhibits certain elements associated with malware.

In one embodiment, at block 305, the classification engine may be configured to take certain action, including for example, generating an alert if the probability exceeds a prescribed value, for example. In one embodiment, the classification engine may be configured so as to inform end users and update the threat intelligence network. Alternatively, at block 306, further analysis may be required with regard to other aspects of the email message, for example, analysis of an object through static analysis, dynamic analysis and/or emulation to make a final decision with respect to maliciousness.

Referring now to FIG. 4, a flowchart of an exemplary method for conducting one or more analyses on an object that is part of the email message is shown. At block 402, the email message is analyzed so as to determine whether any objects are present therein. At block 403, if there is no object, the classification engine may rely on the analysis conducted on the context information associated with meta information within the object to determine maliciousness.

Additionally, or in the alternative, in the event that an object is present, further analysis performed as shown in blocks 405-407. For example, the object (or copies thereof) may be routed to the static analysis engine, the dynamic analysis engine, and/or the emulation engine. Certain attributes from the static analysis engine (characteristics of a file), dynamic analysis engine (behaviors of a file) and/or emulation engine (emulated results), along with delivery protocol attributes associated with the message analysis (block 404), may be combined together and classified based on a presence of these attributes as part of the context information. When classified, as an optional feature, the threat index may be generated based on selected delivery protocol attributes as discussed herein. More specifically, at block 408, a combination of attributes provided by a plurality of analyses (e.g., delivery protocol attributes, SA-based attributes, DA-based attributes, and/or EA-based attributes) is determined by the correlation logic.

Figure 5:
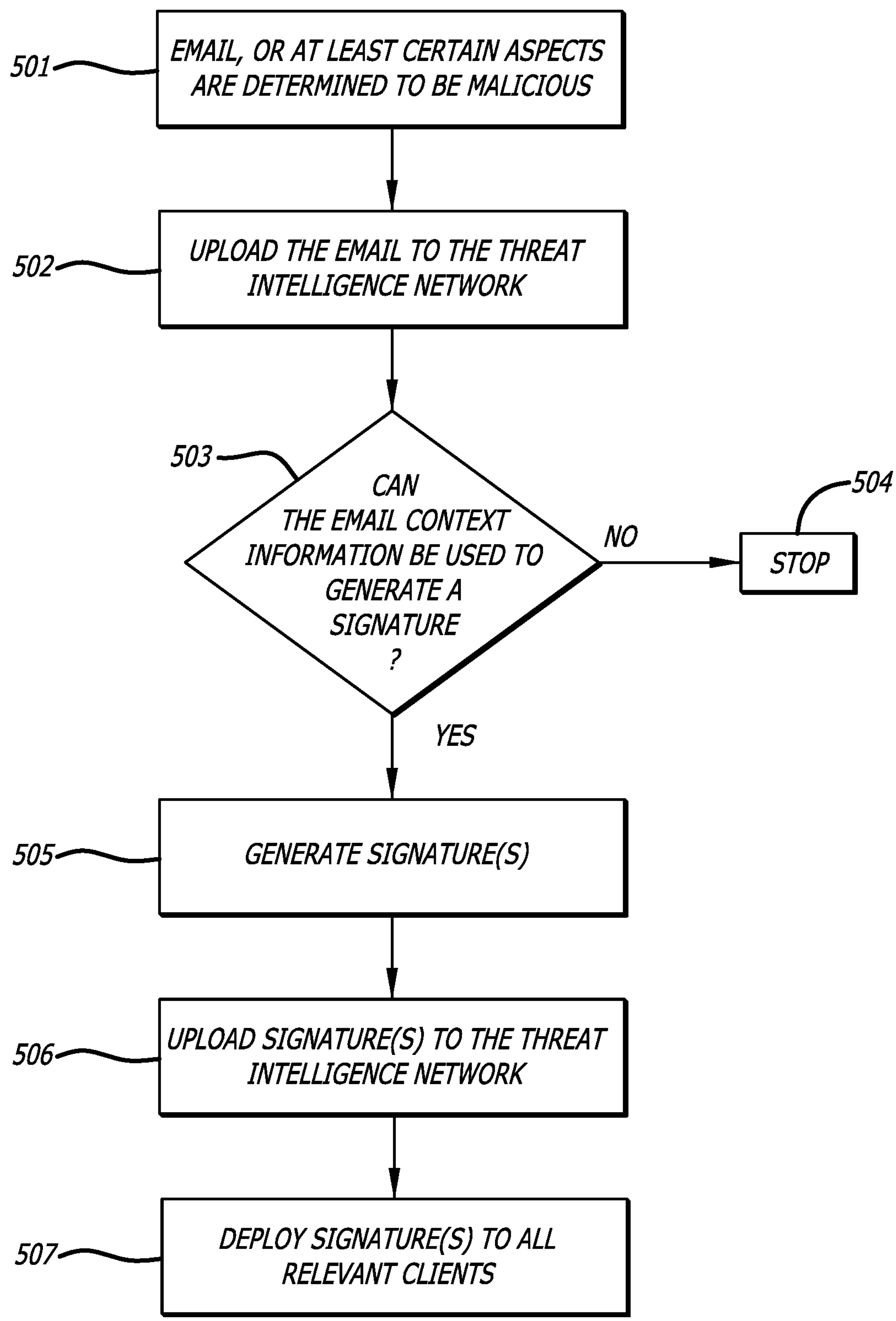
FIG. 5 is a flowchart of an exemplary method for updating a threat intelligence network based on a generated network-based blocking signature.

At block 409, in accordance with an expanded correlation rule set, the correlation logic assists the classification logic in a determination as to whether the email message is malicious. The determination may be based, at least in part, on one or more delivery protocol attributes. More specifically, at block 410, upon determining that the email message is malicious, the classification engine may cause the reporting engine to issue an alert (block 410) and commence a signature generation operation as illustrated in FIG. 5 (block 411). Otherwise, the analysis ends (block 412).

C. Generation of Blocking Signatures

It is envisioned that in order to generate scores from the context information 142, some of the embodiments will require an outbound connection. For example, to determine if a particular mail server exists, a DNS query to the mail server will need to be performed. Based on the response of the DNS, a determination can be made with respect to the existence of the mail server. Similarly, to determine if an email message 140 is valid, an SMTP handshake must be performed with respect to the SMTP server. In some deployment it can happen that the outbound SMTP communication to validate sender might not be possible due to firewall policy.

Reference is now made to FIG. 5, where, at block 501, once an email message is declared as being malicious, the email message is uploaded to the threat intelligence network 130 of FIGS. 1A & 1B, as shown in block 502. At block 503, the context information of the email message is analyzed to determine if the various fields (e.g., meta fields), for example, are sufficiently specific (or even unique) in nature to serve as a signature (strong indicator) for the detected malicious attack. At block 504, a query is presented to determine whether the context information may be used to generate a signature. At block 505, a signature may be generated. In one embodiment, a deterministic, exploit-specific, signature may be generated, however almost any other methodology may be used so as to quickly (and without detailed analysis) identify and classify potential malware samples as malware. In one embodiment, the signature may comprise descriptions (indicators) of malware families. At block 506, the signature is uploaded to the threat intelligence network. Finally, at block 507, the signature is deployed to "users", for example those individuals and entities that have implemented the MMA system and/or have access to the threat intelligence network, e.g., through a subscription service. Since these signatures may consist of meta-fields from the malicious emails, these will classify the email as malicious. Also, if the signature consists of an identifier for the malicious "senders", it will be added to the black list discussed earlier herein.

D. Exemplary Alert

Figure 6:
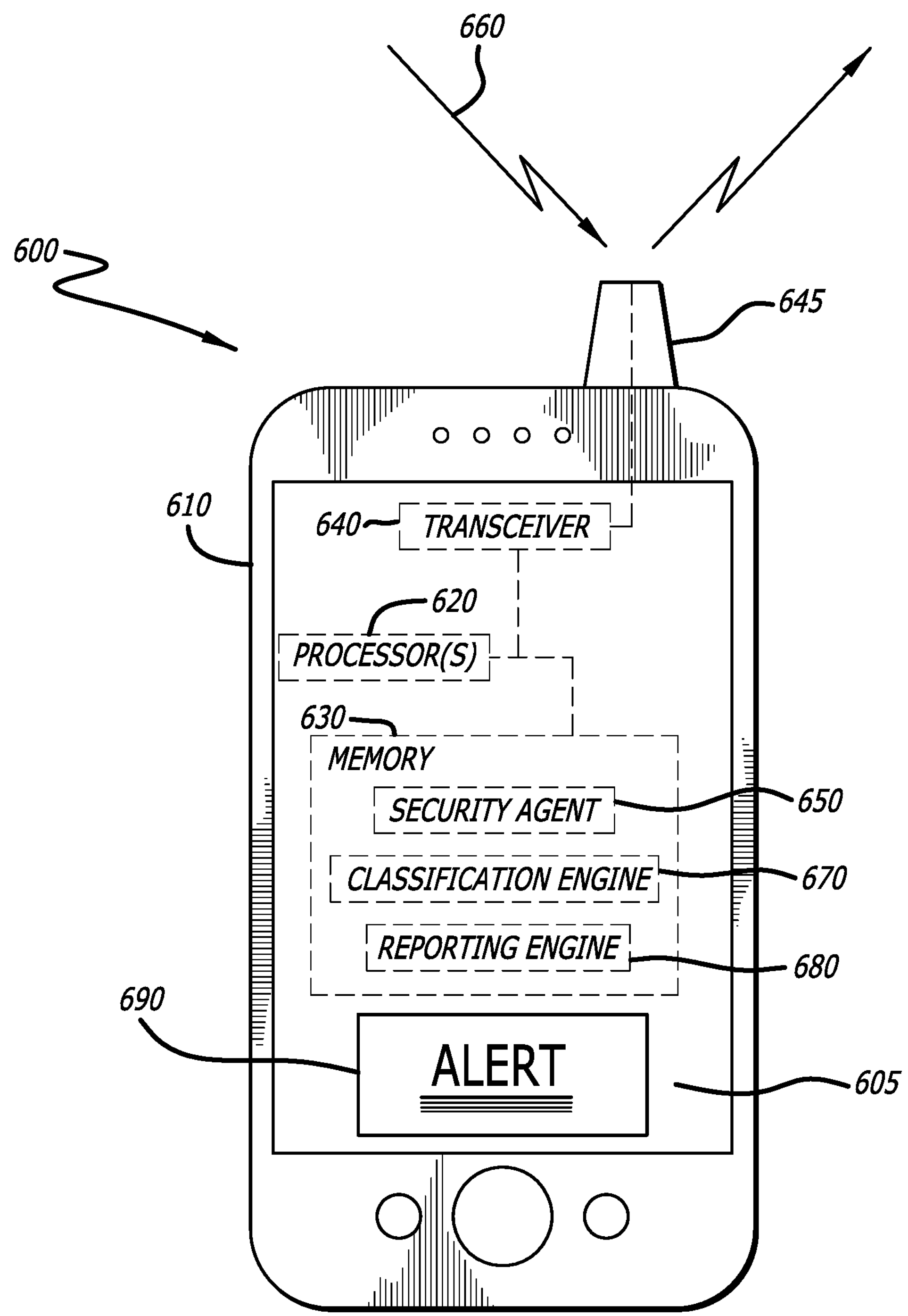
FIG. 6 is an exemplary embodiment of a mobile network device configured for performing the contextual analyses utilizing delivery protocol attributes.

Referring to FIG. 6, an exemplary embodiment of a mobile network device 600 (e.g., smartphone, tablet, laptop computer, netbook, etc.) configured for performing the contextual analyses utilizing delivery protocol attributes as described above is shown. Herein, the mobile network device 600 includes a display screen 605 and a housing 610 that encases one or more processors ("processor(s)") 620, memory 630, as well as one or more receiver and/or transmitter (e.g. transceiver) 640 communicatively coupled to an antenna 645. Herein, the memory 630 includes a security agent 650.

Upon execution by the processor(s) 620, the security agent 650 (executable software application) conducts an analysis on the header and/or body of an incoming email message 660 received by the transceiver 640 of the mobile network device 620. Herein, the security agent 650 conducts an analysis of certain fields of the email message 660, such as certain fields of the header as described above, which may necessitate communications with other network devices (e.g., mail server). Such analysis enables the security agent to produce delivery protocol attributes, which are used in an analysis conducted by a classification engine 670 in determining whether the email message 660 is malicious. Additional static and/or dynamic analysis of an object that is attached to the email message 660 and/or emulation operations associated with object 660 may be used to obtain further attributes that identify anomalous characteristic, behaviors or emulated features, where some of these attributes may be considered in the classification of the email message 660. The delivery attributes and other attributes may be stored in a log that is allocated within the memory 630.

Herein, the memory 630 may further include the classification engine 670 and the reporting engine 680 that operate in combination with the security agent 650 in a manner similar to classification engine 240 and reporting engine 260 of FIGS. 1A-1B and 2 as described above.

In one embodiment, an exemplary alert 690 (e.g., an object, text message, display screen image, etc.) is communicated to security administrators and/or may be displayed for viewing on the mobile network device 600. For example, the exemplary alert 690 may indicate the urgency in handling one or more predicted attacks based on the maliciousness of the suspect object. Furthermore, the exemplary alert 690 may include instructions so as to prevent one or more predicted malware attacks. The exemplary alert 690 may also include information with respect to the origination of the potential attack, along with suspicious behavior that might confirm the attack with respect to a potential target. In one embodiment, the exemplary alert 690 may include index values represented as scores and/or percentages based on the various analyses and/or the combination of detected behaviors, characteristics and/or emulated results that caused the alert 690, as discussed herein.

In the foregoing description, the invention is described with reference to specific exemplary embodiments thereof. However, it will be evident that various modifications and changes may be made thereto without departing from the broader spirit and scope of the invention as set forth in the appended claims.

The invention claimed is:

1. A computerized method configured to analyze a message by a network device, comprising:

conducting a first analysis of an object included as part of the message to generate one or more attributes being a first set of attributes;

determining whether the first set of attributes is determinative as to whether the message is associated with a malicious attack;

generating an alert in response to determining from the first analysis that the message is associated with a malicious attack;

conducting a second analysis of content recovered from a header or a body of the message to generate one or more delivery protocol attributes;

correlating attributes associated with one or more analyses including at least the one or more delivery protocol attributes and the first set of attributes in accordance with one or more correlation rules in response to the first set of attributes not being determinative as to whether the message is associated with the malicious attack;

generating a threat index based on the correlated attributes associated with the one or more analyses; and generating the alert in response to determining that the threat index identifies that the message is associated with a malicious attack.

2. The computerized method of claim 1, wherein the first analysis comprises a dynamic analysis of the object that is part of the message, the dynamic analysis comprises processing the object within a virtual machine and monitoring for one or more behaviors of the virtual machine, wherein the one or more behaviors being the first set of attributes.

3. The computerized method of claim 1, wherein the first analysis comprises a static analysis is configured to inspect the object for anomalous characteristics comprising any one of selected formatting and patterns associated with malware, the anomalous characteristics being the first set of attributes.

4. The computerized method of claim 1, wherein the correlating attributes associated with the one or more analyses in accordance with the one or more correlation rules comprises correlating attributes from at least the first set of attributes, the one or more delivery protocol attributes, and at least a second set of attributes generated from a secondary analyses of the object.

5. The computerized method of claim 1, wherein the analysis of the content recovered from the header or the body of the message comprises analysis of a field of the header to determine a source of the message.

6. The computerized method of claim 5, wherein the analysis of the field of the header further comprises conducting a handshaking communication session to determine that the message is associated with a malicious attack by verifying that a sender of the message belongs to a prescribed domain identified as a domain of the sender in the message.

7. The computerized method of claim 1, wherein the one or more correlation rules are directed to detection of the first set of attributes in combination with attributes from at least one or more of (i) static analysis of an object included with the message, (ii) dynamic analysis of the object, and (iii) emulation of the processing of the object.

8. The computerized method of claim 1, wherein the threat index comprises an association of one or more weighting factors to place higher probative likelihood of maliciousness with respect to a combination of attributes including the first set of attributes and attributes associated with at least one of (i) static analysis of an object included with the message, (ii) dynamic analysis of the object, and (iii) emulation of the processing of the object.

9. The computerized method of claim 1, wherein in further response to determining that the threat index identifies that the message is malicious, the method further comprises:

uploading the message to a threat intelligence network;

determining if the context information may be used to generate a static signature;

generating the static signature;

uploading the signature to the threat intelligence network; and deploying the signature to one or more network devices other than the network device.

10. The computerized method of claim 1, wherein the message comprises an electronic mail message.

11. The computerized method of claim 4, wherein the first analysis of the object corresponds to a dynamic analysis of the object and the secondary analysis of the object corresponds to a static analysis of the object.

12. The computerized method of claim 4, wherein the first analysis of the object corresponds to a static analysis of the object and the secondary analysis of the object corresponds to a dynamic analysis of the object.

13. The computerized method of claim 1, wherein the one or more delivery protocol attributes are based on content that is recovered from the header or the body of the message and directed to a formatting of the message.

14. The computerized method of claim 1, wherein the one or more delivery protocol attributes are based on content recovered from the header or the body of the message directed to a formatting of the message.

15. The computerized method of claim 1, wherein the one or more delivery protocol attributes are based on an informality associated with the message that is detected during a handshaking communication session.

16. The computerized method of claim 1, wherein the one or more delivery protocol attributes are based on a format violation in accordance with a delivery protocol messaging specification.

17. A system to detect malicious messages, comprising:
one or more processors; and
a storage module communicatively coupled to the one or more processors, the storage module including
logic to determine context information comprising one or more combinations of attributes by performing one or more analyses, the logic comprises (a) a meta analyzer to analyze meta information of the message to generate a first set of attributes and (b) one or more engines including (i) a static analysis engine or (ii) a dynamic analysis engine or (iii) an emulation engine to analyze an object attached to the message to produce a second set of attributes,
correlation logic to correlate attributes associated with the second set of attributes, in accordance with one or more correlation rules so as to generate a first threat index,
classification engine to determine whether the first threat index identifies that the message is malicious, and
reporting engine to generate an alert in response to determining that the first threat index identifies that the message is malicious, wherein
in response to the first threat index failing to identify the message is malicious, the correlation logic being further configured to correlate attributes associated with the one or more analyses, including the first set of attributes and the second set of attributes, in accordance with the one or more correlation rules so as to generate a second threat index,
the classification engine to determine whether the second threat index identifies that the message is malicious, and
the reporting engine to generate the alert in response to determining that the second threat index identifies that the message is malicious.

18. The system of claim 17, wherein the one or more engines comprise a dynamic analysis engine that is configured to process the object within a virtual machine and monitor for one or more behaviors of the virtual machine, wherein the one or more behaviors being the second set of attributes.

19. The system of claim 18, wherein the one or more engines a static analysis engine that is configured to inspect the object for anomalous characteristics comprising selected formatting and patterns associated with malware, the anomalous characteristics being a third set of attributes.

20. The system of claim 19, wherein the correlation logic to correlate attributes associated with the one or more analyses in accordance with the one or more correlation rules, the correlated attributes include at least the first set of attributes and at least one of the second set of attributes and the third set of attributes.

21. The system of claim 17, wherein the meta analyzer analyzes a header field to determine a source of the message.

22. The system of claim 21, wherein the meta analyzer further conducts a handshaking communication session to determine that the message is associated with a malicious attack by verifying that a sender of the message belongs to a prescribed domain identified as a domain of the sender in the message.

23. The system of claim 17, wherein the one or more correlation rules are directed to detection of the first set of attributes in combination with the second set of attributes from at least one or more of (i) static analysis of the object included with the message, (ii) dynamic analysis of the object, and (iii) emulation of the processing of the object.

24. The system of claim 17, wherein the threat index comprises an association of one or more weighting factors to place higher probative likelihood of maliciousness with respect to a combination of attributes including the first set of attributes and the second set of attributes associated with at least one of (i) static analysis of an object included with the message, (ii) dynamic analysis of the object, and (iii) emulation of the processing of the object.

25. The system of claim 17 further comprises logic to:
upload the message to a threat intelligence network;
determine if the context information may be used to generate a static signature;
generate the static signature;
upload the signature to the threat intelligence network; and
deploy the signature to one or more network devices other than the network device.

26. The system of claim 19, wherein the message comprises an electronic mail message.

27. The system of claim 17, wherein the meta analyzer includes at least a header analysis logic and a format analysis logic, wherein the header analysis logic is configured to determine a legitimacy of a source of the message or a legitimacy in identification of a sender of the message and the format analysis logic is configured to determine a format violation in a header of the message based on message format specifications.

28. A computerized method configured to analyze a message by a network device, comprising:
determining context information comprising one or more combinations of attributes by performing one or more analyses, the one or more analyses comprises a first analysis of content recovered from a header of the message to generate a first set of attributes corresponding to one or more delivery protocol attributes;
correlating attributes associated with the one or more analyses, including the first set of attributes, in accordance with one or more correlation rules;
generating a first threat index based on the first set of attributes; and
generating an alert in response to determining that the first threat index identifies that the message is associated with a malicious attack;
generating another threat index based on a second set of attributes in response to determining that the first threat index fails to identify that the message is associated with a malicious attack; and
generating an alert in response to determining that the second threat index identifies that the message is associated with a malicious attack.

29. The computerized method of claim 28, wherein the one of more analysis further comprises a dynamic analysis of an object that is part of the message, the dynamic analysis comprises processing the object within a virtual machine and monitoring for one or more behaviors of the virtual machine, wherein the one or more behaviors being a second set of attributes different from the first set of attributes.

30. The computerized method of claim 28, wherein the one of more analysis further comprises a static analysis is configured to inspect the object for anomalous characteristics comprising any one of selected formatting and patterns associated with malware, the anomalous characteristics being a set of attributes different from the first set of attributes.

31. The computerized method of claim 28, wherein the correlating attributes associated with the one or more analyses in accordance with the one or more correlation rules comprises correlating attributes from at least the first set of attributes, and at least one of a second set of attributes and a third set of attributes.

32. The computerized method of claim 28, wherein the first analysis of the content comprises an analysis of the content from a header of the message including an analysis of a field of the header to determine a source of the message.

33. The computerized method of claim 28, wherein the one or more delivery protocol attributes are based on content that is recovered from the header or the body of the message and directed to a formatting of the message.

34. The computerized method of claim 28, wherein the one or more delivery protocol attributes are based on content recovered from the header or the body of the message directed to a formatting of the message.

35. The computerized method of claim 28, wherein the one or more delivery protocol attributes are based on an informality associated with the message that is detected during a handshaking communication session.

36. The computerized method of claim 28, wherein the one or more delivery protocol attributes are based on a format violation in accordance with a delivery protocol messaging specification.

* * * * *